| (12) | United States Patent | (10) Patent No.: | US 8,578,617 B2 |
|---|---|---|---|
| | Matsuyama | (45) Date of Patent: | Nov. 12, 2013 |

(54) EYEGLASS FRAME SHAPE MEASUREMENT APPARATUS

(75) Inventor: Yoshinori Matsuyama, Aichi (JP)

(73) Assignee: Nidek Co., Ltd., Aichi (JP)

( * ) Notice: Subject to any disclaimer, the term of this patent is extended or adjusted under 35 U.S.C. 154(b) by 371 days.

(21) Appl. No.: 12/963,081

(22) Filed: Dec. 8, 2010

(65) Prior Publication Data

US 2011/0131822 A1    Jun. 9, 2011

(30) Foreign Application Priority Data

Dec. 9, 2009   (JP) ................. 2009-279943

(51) Int. Cl.
  *G01B 5/20*   (2006.01)
  *G02C 13/00*   (2006.01)

(52) U.S. Cl.
  USPC .................. 33/200; 33/28; 33/507

(58) Field of Classification Search
  USPC ............ 33/200, 507, 551, 553, 554
  See application file for complete search history.

(56) References Cited

U.S. PATENT DOCUMENTS

| 4,995,170 | A | 2/1991 | Brule et al. | |
|---|---|---|---|---|
| 6,325,700 | B1 | 12/2001 | Mizuno et al. | |
| 6,350,190 | B1 | 2/2002 | Matsuyama et al. | |
| 6,473,977 | B1 | 11/2002 | Kujawa | |
| 7,571,545 | B2 | 8/2009 | Nauche et al. | |
| 7,631,431 | B2 * | 12/2009 | Matsuyama | ............ 33/28 |
| 7,681,321 | B2 | 3/2010 | Shibata et al. | |
| 8,015,716 | B2 * | 9/2011 | Matsuyama | ............ 33/200 |
| 2004/0221465 | A1 | 11/2004 | Smith et al. | |

| 2005/0235507 | A1 | 10/2005 | Badami et al. | |
|---|---|---|---|---|
| 2005/0275802 | A1 * | 12/2005 | Nauche et al. | ............ 351/177 |
| 2009/0172960 | A1 | 7/2009 | Meunier et al. | |

FOREIGN PATENT DOCUMENTS

| JP | 64-38720 A | 2/1989 |
|---|---|---|
| JP | 2000-314617 A | 11/2000 |
| JP | 2000-317795 A | 11/2000 |
| JP | 2001-174252 A | 6/2001 |
| JP | 2006-350264 A | 12/2006 |
| JP | 2009-014517 A | 1/2009 |
| JP | 200968926 A | 4/2009 |
| WO | 2006/036120 A1 | 4/2006 |

OTHER PUBLICATIONS

Communication dated Feb. 4, 2011, issued in corresponding European Patent Application No. 10015495.4 (6 pages).
Extended European Search Report dated Feb. 4, 2011, issued in European Patent Application No. 10015496.2 which corresponds to co-pending U.S. Appl. No. 12/963,082.
Office Action dated Jul. 30, 2013 issued by the Japanese Patent Office in Japanese Application No. 2009279943.

* cited by examiner

*Primary Examiner* — R. A. Smith
(74) *Attorney, Agent, or Firm* — Sughrue Mion, PLLC

(57) ABSTRACT

An apparatus for measuring a shape of an eyeglass frame, includes: a tracing stylus to detect a position of the rim in a moving radius direction and in a vertical, a tracing stylus shaft for the tracing stylus, a holding unit movably holding the tracing stylus shaft and including a pressure applying element for pressing a tip end of the tracing stylus to the rim, a moving unit for moving the holding unit, a rotating unit for rotating the holding unit around an axis along a vertical direction; a moving radius position detection unit configured to detect a position of the tracing stylus; and a controller configured to obtain a rotating angle of the rotating unit and a position of the holding unit in the moving radius direction at a next measurement position, and control the rotating unit and the moving unit.

10 Claims, 17 Drawing Sheets

EYEGLASS FRAME SHAPE MEASUREMENT APPARATUS

BACKGROUND OF THE INVENTION

The present invention relates to an eyeglass frame shape measurement apparatus which trace a rim of an eyeglass frame and measures a three-dimensional shape of the rim.

Various eyeglass frame shape measurement apparatuses are known in which a tracing stylus is pressed and inserted into the groove of a rim of an eyeglass frame held by an eyeglass frame holding mechanism, and the position of the tracing stylus which moves to follow changes in the rim is detected to obtain the three-dimensional shape of the rim in a moving radius direction (XY direction) and a direction perpendicular to the moving radius direction (Z direction) (for example, see JP-A-2000-314617 (U.S. Pat. No. 6,325,700), JP-A-2001-174252, JP-A-2006-350264 (U.S. Pat. No. 7,571,545), JP-A-2009-14517 (U.S. Pat. No. 7,681,321), etc.).

As shown in FIG. 14, a measurement mechanism of this type of the apparatus includes a rotation base RB which rotates with respect to a rim FW, a tracing stylus shaft SA which has a tracing stylus ST attached to an upper end thereof, a moving base VB which movably holds the tracing stylus shaft SA in an up-down direction (Z direction) and is provided in the rotation base RB to be movable in a moving radius direction passing through the rotation center CO of the rotation base RB, and an urging mechanism which urges the moving base VB toward the rim FW so as to generate a measurement pressure for pressing the tracing stylus ST into the groove of the rim FW. The tracing stylus ST moves to follow changes in the rim on the basis of the rotation of the rotation base RB, and the movement of the tracing stylus ST at that time is detected. Thus, the three-dimensional shape of the rim is measured.

In recent years, an eyeglass frame in which the rim has a large curvature is increasingly used. Thus, a tracing stylus having a needle-like tip end is used.

SUMMARY OF THE INVENTION

In measuring the shape of the rim accurately, it is preferable that the tracing stylus does not apply excess force to the rim, and the tracing stylus follows changes in the rim as smoothly as possible. However, in the measurement mechanism of the related art, excess force is applied to the rim in measuring the rim having a long a linear portion, such that the rim is likely to be deformed. That is, as shown in FIG. 14, in addition to the measurement pressure PS by the urging mechanism, the rotation force of the rotation base RB is applied to the tip end of the tracing stylus ST. The rotation force of the rotation base RB is comparatively large, and in a state where the tip end of the tracing stylus ST comes into contact with the rim FW obliquely, a force PC is applied in the outward direction which significantly deviates from the direction in which the rim FW changes, causing the rim FW to be deformed. In this case, the measurement accuracy of the rim FW is degraded.

In the tracing stylus ST having a needle-like tip end, if the tip end of the tracing stylus ST comes into contact with the rim FW at an acute angle, the tip end of the tracing stylus ST is likely to be caught by a step at the joint of the rim FW, making it impossible to measure the shape of the rim accurately.

The rim FW is clamped by clamp pins CP provided in the eyeglass frame holding mechanism, the curvature (the change in the Z direction) of the rim FW around the clamp pins CP is large, and if the tip end of the tracing stylus ST comes into contact with the rim FW at an acute angle, the tracing stylus ST interferes with the clamp pins CP, making it impossible to measure the shape of the rim accurately.

In recent years, with the diversification in frame design, rims which are elongated in the left-right direction, or which are recessed inwardly have appeared. However, if the angle of the tip end of the tracing stylus ST with respect to the rim FW is excessively acute, the tracing stylus shaft SA interferes with the rim, making it impossible to carry out accurate measurement.

In accurately measuring a highly curved frame in which a rim has a large curvature, it is preferable that the tracing stylus follows smoothly changes in the rim in a direction (Z direction) perpendicular to the moving radius direction. In a mechanism which causes the tracing stylus to follow over the entire range in the Z direction in which the rim changes, the following mechanism increases in size and weight. For this reason, there is trouble in smooth movement of the tracing stylus, and measurement accuracy is deteriorated. There is also a problem in that the tracing stylus easily drops out of the groove of the rim.

Taking into consideration of the problems inherent in the apparatus of the related art, a technical object of the invention is to provide an eyeglass frame shape measurement apparatus capable of measuring the shape of a rim accurately.

In order to achieve the above-described object, the invention has the following configuration.

(1) An eyeglass frame shape measuring apparatus for measuring a shape of a rim of an eyeglass frame, comprising:

a tracing stylus including a tip end configured to be inserted into and move along a groove of the rim to detect a position of the rim in a moving radius direction of the tracing stylus and in a vertical direction perpendicular to the moving radius direction;

a tracing stylus shaft including an upper part to which the tracing stylus is attached;

a holding unit configured to hold the tracing stylus shaft to be movable in the vertical direction and a direction of the tip end of the tracing stylus, the holding unit including a pressure applying element configured to apply a pressure to the tracing stylus shaft so as to press the tip end of the tracing stylus to the groove of the rim in the direction of the tip end of the tracing stylus;

a moving unit configured to two-dimensionally move the holding unit in the moving radius direction;

a rotating unit configured to rotate the holding unit around an axis along the vertical direction to change the direction of the tip end of the tracing stylus;

a moving radius position detection unit configured to detect a position of the tracing stylus in the moving radius direction, the moving radius position detection unit including at least a first detection unit configured to detect a position of the holding unit in the moving radius direction and a second detection unit configured to detect a position of the tracing stylus in the moving radius direction relative to the holding unit; and a controller configured to obtain a rotating angle of the rotating unit and a position of the holding unit in the moving radius direction at a next measurement position based on a detecting result of the moving radius position detecting unit obtained after starting a measurement, and control the rotating unit and the moving unit based on the obtained rotating angle and the obtained position.

(2) The apparatus according to (1), wherein the controller predicts the next measurement position based on the detecting result of the moving radius position detection unit and obtains the rotating angle of the rotating unit and the position of the holding unit in the moving radius direction at the predicted next measurement position.

(3) The apparatus according to (1), wherein
the rotating unit is provided at the holding unit,
the controller controls the rotating unit so as to direct the direction of the tip end of the tracing stylus to any one of:
a first direction which is substantially a normal direction to a predicted shape in which a shape of an unmeasured portion of the rim is predicted based on the detecting result of the moving radius position detection unit;
a second direction which is in the moving radius direction at the measurement position with respect to a predetermined reference position set inside the rim; and
a third direction between the first and second directions.

(4) The apparatus according to (1), wherein
the rotating unit is provided at the moving unit, and
the controller directs the direction of the tip end of the tracing stylus to the moving radius direction at the measurement position with respect to a reference position which is a rotation center of the rotating unit.

(5) The apparatus according to (1), wherein
the holding unit includes a bearing configured to holding the tracing stylus shaft so that the tracing stylus shaft can be tilt in the direction of the tip end of the tracing stylus around a shaft set at a lower part of the tracing stylus shaft,
the pressure applying element applies the pressure so that the tracing stylus shaft tilts to the direction of the tip end of the tracing stylus around the shaft,
the second detection unit includes a rotation detection unit configured to detect a tilt angle of the tracing stylus shaft around the shaft.

(6) The apparatus according to (1) further comprising a vertical position detection unit configured to detect a position of the tracing stylus in the vertical direction,
wherein the controller determines a tilt angle of the tracing stylus shaft with respect to the vertical direction based on a detection result of the vertical position detection unit, and controls the moving unit so as to tilt the tracing stylus shaft to the determined tilt angle.

(7) The apparatus according to (6), wherein
the controller determines the tilt angle of the tracing stylus shaft so that the tilt angle increases as the measurement position with respect to a predetermined reference position in the vertical direction becomes high.

(8) The apparatus according to (1), wherein
the rotating unit is provided at the holding unit,
the second detection unit includes a sensor for detecting the rotating angle of the rotating unit, and a sensor for detecting the position of the tracing stylus in the direction of the tip end of the tracing stylus.

(9) The apparatus according to (1), wherein
the moving unit includes a X-direction motor and a Y-direction motor for two-dimensionally moving the holding unit in a X direction and a Y direction of the moving radius direction, and
the first detection unit detects the position of the holding unit in the moving radius direction based on driving data of the X-direction motor and the Y-direction motor.

(10) The apparatus according to (1),
the moving unit includes a rotating base to be rotatable around an axis along the vertical direction and is located inside the rim, a rotating motor configured to rotate the rotating base, and a horizontal moving unit having a motor for moving the holding unit in the moving radius direction with a rotation center of the rotating base as a reference position, and the first detection unit detects the position of the holding unit in the moving radius direction based on driving data of the motors of the moving unit.

DETAILED DESCRIPTION OF EXEMPLARY EMBODIMENTS

Figure 1:
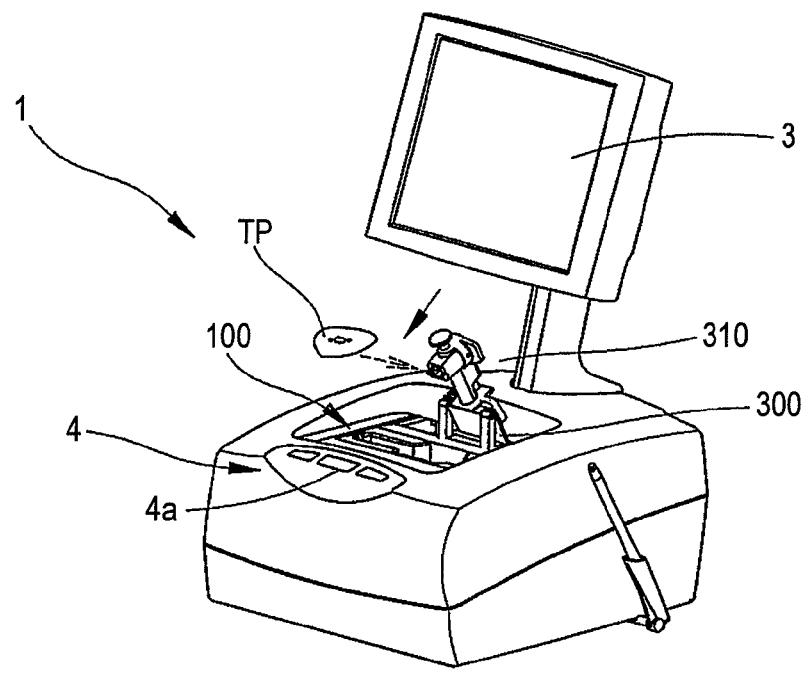
FIG. 1 is a schematic appearance view of an eyeglass frame shape measurement apparatus.

Hereinafter, an exemplary embodiment according to the invention will be described with reference to the drawings. FIG. 1 is a schematic appearance diagram of an eyeglass frame shape measurement apparatus. The eyeglass frame shape measurement apparatus 1 includes a frame holding unit 100 which holds an eyeglass frame F in a desired state, and a measurement unit 200 which inserts a tracing stylus into a groove of a rim of an eyeglass frame held by the frame holding unit 100 and detects the movement of the tracing stylus to measure the three-dimensional shape of the rim. The measurement unit 200 is arranged below the frame holding unit 100. An attachment portion 300 for detachably attaching a template holder 310 used in measuring a template TP (or a demo lens attached to the eyeglass frame) is arranged rearward of an apparatus 1 at the center in the lateral direction. As the template holder 310, a known template holder described in JP-A-2000-317795 (U.S. Pat. No. 6,325,700) or the like may be used.

A switch section 4 which has a switch for measurement start and the like is arranged on the front side of the housing of the measurement apparatus 1. A panel section 3 which has a touch panel-type display is arranged on the rear side of the housing of the measurement apparatus 1. When edging a lens, layout data of the lens with respect to target lens shape data, the processing conditions of the lens, and the like are input through the panel section 3. Three-dimensional shape data of the rim obtained by the measurement apparatus 1 and data input through the panel section 3 are transmitted to an eyeglass lens edging apparatus. Similarly to JP-A-2000-314617 and the like, the measurement apparatus 1 may be incorporated in the eyeglass lens edging apparatus.

Figure 2:
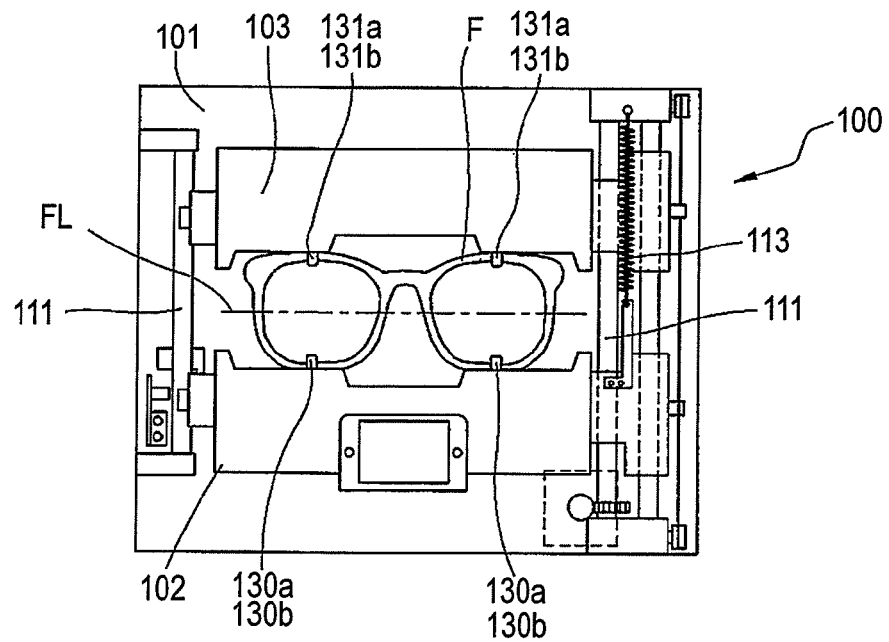
FIG. 2 is a top view of a frame holding unit.

FIG. 2 is a top view of the frame holding unit 100 in a state where the eyeglass frame F is held. The measurement unit 200 is provided below the frame holding unit 100. A front slider 102 and a rear slider 103 are placed on a holding section base 101 so as to hold the eyeglass frame F substantially horizontally. The front slider 102 and the rear slider 103 are slidably arranged to be opposite to each other on two rails 111 with respect to a central line FL and are continuously pulled toward the central line FL by a spring 113.

In the front slider 102, clamp pins 130a and 130b are arranged at two places so as to clamp the rim of the eyeglass frame F in the thickness direction (vertical direction). Similarly, in the rear slider 103, clamp pins 131a and 131b are arranged at two places so as to clamp the rim of the eyeglass frame F in the thickness direction (vertical direction).

As shown in the drawing, the eyeglass frame F is set such that the lower side of the rim at the time of wearing is positioned on the front slider 102 side, and the upper side of the rim is positioned on the rear slider 103 side. The eyeglass frame F is held in a predetermined measurement state by the clamp pins on the upper and lower sides of the left and right rims.

A configuration example of the measurement unit 200 will be described with reference FIGS. 3 to 8. The measurement unit 200 includes a sensor unit (tracing stylus holding unit) 250 which holds a tracing stylus 281 to be inserted into the groove of the rim, and a moving unit 210 which moves the sensor unit 250 in the XYZ directions. The XY directions are parallel to the measurement plane (the moving radius direction of the rim) of the eyeglass frame F held by the frame holding unit 100, and the Z direction is perpendicular to the measurement plane. The sensor unit 250 includes a tracing stylus shaft 282 with the tracing stylus 281 attached to the upper part thereof, and holds the tracing stylus shaft 282 to be movable in the Z direction such that the tracing stylus 281 moves to follow changes in the rim in the Z direction. The sensor unit 250 holds the tracing stylus shaft 282 to be movable in the tip end direction of the tracing stylus 281, and includes a measurement pressure application mechanism which applies a measurement pressure to press the tip end of the tracing stylus 281 into the groove of the rim.

Figure 3:
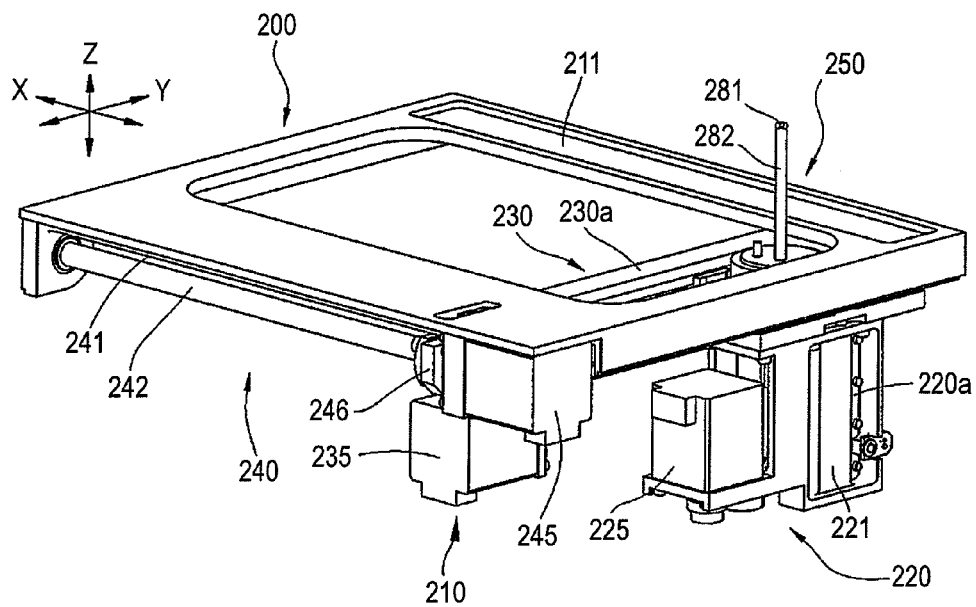
FIG. 3 is a perspective view of a moving unit when viewed from above.
Figure 4:
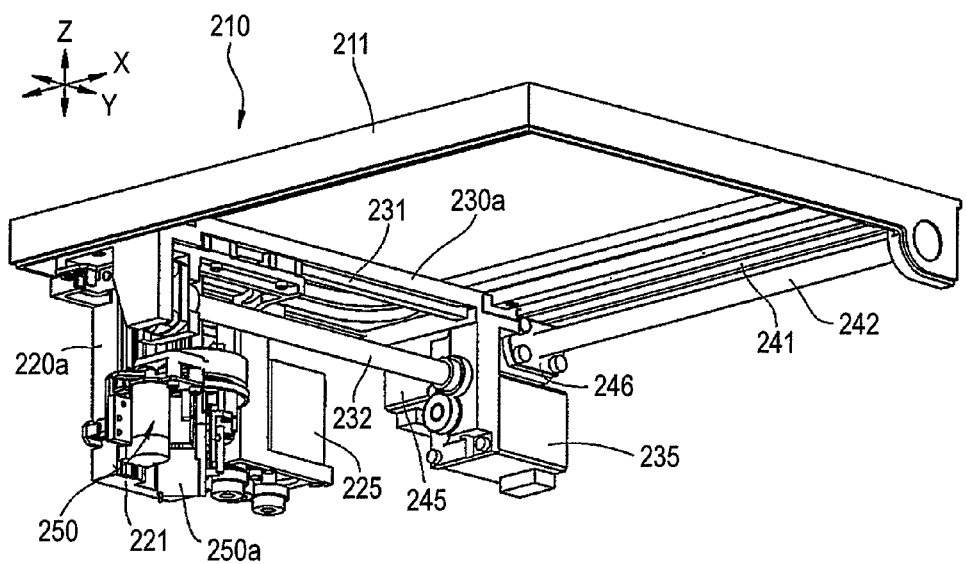
FIG. 4 is a perspective view of a moving unit when viewed from below.
Figure 5:
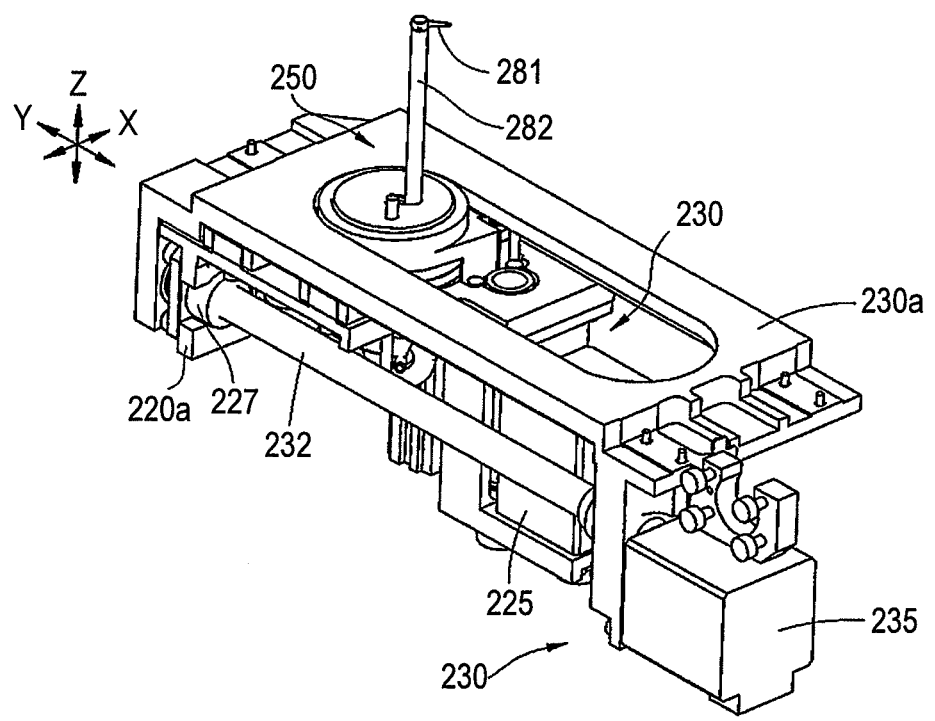
FIG. 5 is an upward perspective view of a Z moving unit and a Y moving unit.

FIGS. 3 to 5 are diagrams illustrating the configuration of the moving unit 210. FIG. 3 is a perspective view of the moving unit 210 when viewed from above. FIG. 4 is a perspective view of the moving unit 210 when viewed from below. FIG. 5 is an upward perspective view of a Z moving unit 220 and a Y moving unit 230 (a perspective view showing a state where an X moving unit 240 and a base section 211 are detached).

The moving unit 210 broadly includes the Z moving unit 220 which moves the sensor unit 250 in the Z direction, the Y moving unit 230 which holds the sensor unit 250 and the Z moving unit 220 and moves the sensor unit 250 and the Z moving unit 220 in the Y direction, and the X moving unit 240 which moves the sensor unit 250 in the X direction together with the Z moving unit 220 and the Y moving unit 230.

The X moving unit 240 is schematically configured as follows. A guide rail 241 extending in the X direction is attached to the lower part of the base section 211 having a rectangular frame extending in the horizontal direction (XY directions). A Y base 230a of the Y moving unit 230 is attached to be movable in the X direction along the guide rail 241. A pulse motor 245 is attached to the base section 211. A feed screw 242 extending in the X direction is attached to the rotation shaft of the motor 245. A nut 246 fixed to the Y base 230a is screwed to the feed screw 242. Thus, if the motor 245 is rotated, the Y base 230a is moved in the X direction.

The movement range of the X moving unit 240 in the X direction has a length such that the Y base 230a on which the sensor unit 250 is mounted is movable equal to or greater than the width of the eyeglass frame in the lateral direction, thereby measuring the left and right rims of the eyeglass frame.

The Y moving unit 230 is schematically configured as follows. A guide rail 231 extending in the Y direction is attached to the Y base 230a, and the Z base 220a is attached to be movable in the Y direction along the guide rail 231. A pulse motor 235 for Y movement and a feed screw 232 extending in the Y direction are rotatably attached to the Y base 230a. The rotation of the motor 235 is transmitted to the feed screw 232 through a rotation transmission mechanism, such as a gear. A nut 227 attached to the Z base 220a is screwed to the feed screw 232. With the above-described configuration, if the motor 235 is rotated, the Z base 220a is moved in the Y direction.

The XY moving unit is constituted by the X moving unit 240 and the Y moving unit 230. The range in which the sensor unit 250 is moved in the XY directions is greater than the measurable radius of the rim. Thus, it is possible to reduce the movement range of the tracing stylus shaft 282 which is held by the sensor unit 250 to be movable in the moving radius direction. The movement positions of the sensor unit 250 in the XY directions are detected by the number of pulses in which the motors 245 and 235 are driven by a controller 50 described below. A first XY position detection unit which detects the positions of the sensor unit 250 in the XY directions is constituted by the motors 245 and 235 and the controller 50. As the XY position detection unit of the sensor unit 250, a sensor may be used, such as an encoder which performs detection through pulse control of the motors 245 and 235, and is attached to the rotation shaft of each of the motors 245 and 235.

The Z moving unit 220 is schematically configured as follows. A guide rail 221 extending in the Z direction is formed on the Z base 220a, and a moving base 250a is held to be movable in the Z direction along the guide rail 221. The sensor unit 250 is attached to the moving base 250a. A pulse motor 225 for Z movement is attached to the Z base 220a, and a feed screw (not shown) extending in the Z direction is also rotatably attached to the Z base 220*a*. The feed screw is screwed to a nut attached to the moving base 250*a* of the sensor unit 250. The rotation of the motor 225 is transmitted to the feed screw 222 through a rotation transmission mechanism, such as a gear, and the sensor unit 250 is moved in the Z direction in accordance with the rotation of the feed screw 222. The movement position of the sensor unit 250 in the Z direction is detected by the number of pulses in which the motor 225 is driven by the controller 50 described below. A first Z position detection unit which detects the position of the sensor unit 250 in the Z direction is constituted by the motor 225 and the controller 50. As the Z position detection unit of the sensor unit 250, a sensor may be used, such as an encoder which performs detection through pulse control of the motor 225 and is attached to the rotation shaft of the motor 225.

Figure 10:
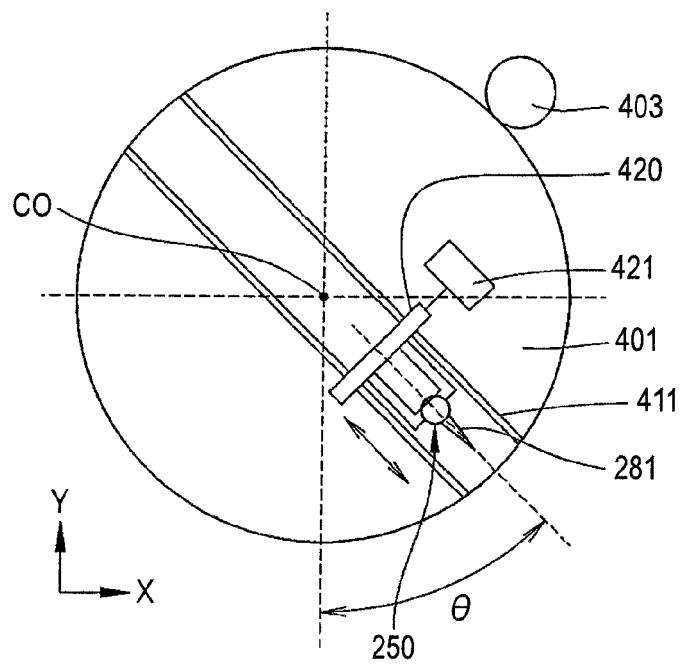
FIG. 10 shows a modification of an XY moving unit.

The respective moving mechanisms in the X direction, the Y direction, and the Z direction are not limited to those in the embodiment, and known mechanisms may be used. For example, as shown in FIG. 10, the XY moving unit may include a rotation base 401 which is rotated around a rotation center CO (the axis in the Z direction) by a motor 403, a guide rail 411 which is provided in the rotation base 401 in parallel to the moving radius direction around the rotation center CO, and a horizontal moving unit 420 which is moved along the guide rail 411 by a driving mechanism 421, such as a motor. The sensor unit 250 and the Z moving unit 220 are mounted in the horizontal moving unit 420. Instead of linearly moving the sensor unit 250 having the tracing stylus 281, as described in JP-A-2006-350264 (U.S. Pat. No. 7,571,545), the sensor unit 250 may be moved in an arc-shaped path around the rotation base. In these cases, the position of the sensor unit 250 in the X and Y directions (radius direction) is based on driving data of the motor 403 of the rotation base and the motor of the horizontal moving unit 420 (or motor which moves the sensor unit 250 in the arc-shaped path). In addition, an XY moving unit may also be configured using a robot arm. A rotation mechanism having a rotatable arm may be incorporated in the Z moving unit.

Next, the configuration of the sensor unit 250 will be described with reference to FIGS. 6A to 9. The sensor unit 250 includes a tracing stylus shaft holding unit (hereinafter, referred to as a VH unit) 280. The VH unit 280 includes the tracing stylus shaft 282 with the tracing stylus 281 attached to the upper end thereof. The VH unit 280 holds the tracing stylus shaft 282 to be movable in a predetermined range in the Z direction and also holds the tracing stylus shaft 282 to be movable in the direction toward which the tip end of the tracing stylus 281 is directed. It is preferable that the VH unit 280 holds the tracing stylus shaft 282 to be tiltable in the direction toward which the tip end of the tracing stylus 281 is directed such that the tracing stylus shaft 282 is movable in the horizontal direction. The sensor unit 250 includes a rotation unit 260 which rotates the VH unit 280 around a central axis LO extending in the Z direction so as to be changed in the XY directions toward which the tip end of the tracing stylus 281 is directed.

Figure 6A:
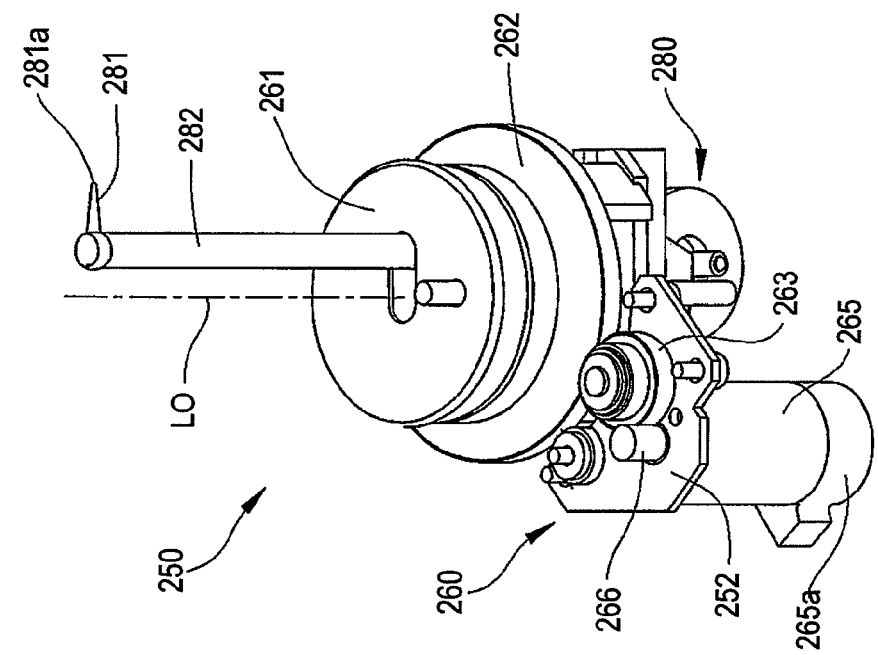
FIG. 6A is an upward perspective view of a sensor unit.
Figure 6B:
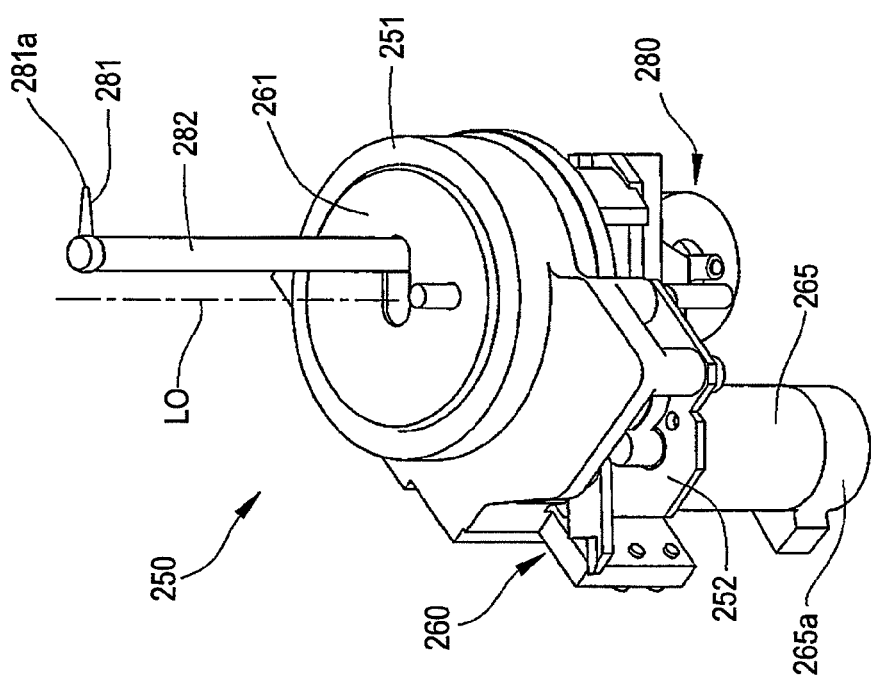
FIG. 6B is an explanatory view of a rotation unit of a sensor unit.
Figure 7:
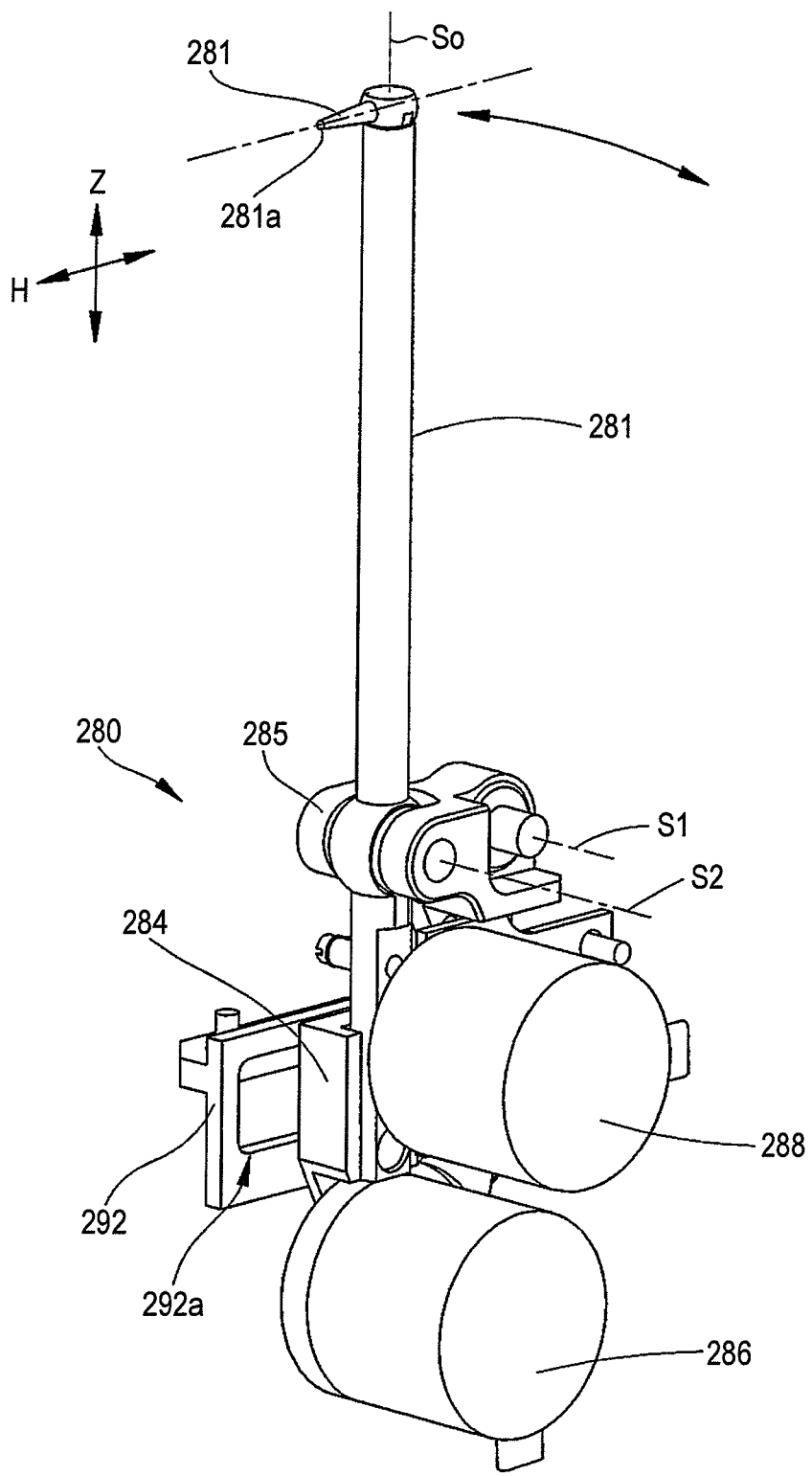
FIG. 7 is a perspective view of a VH unit.
Figure 8:
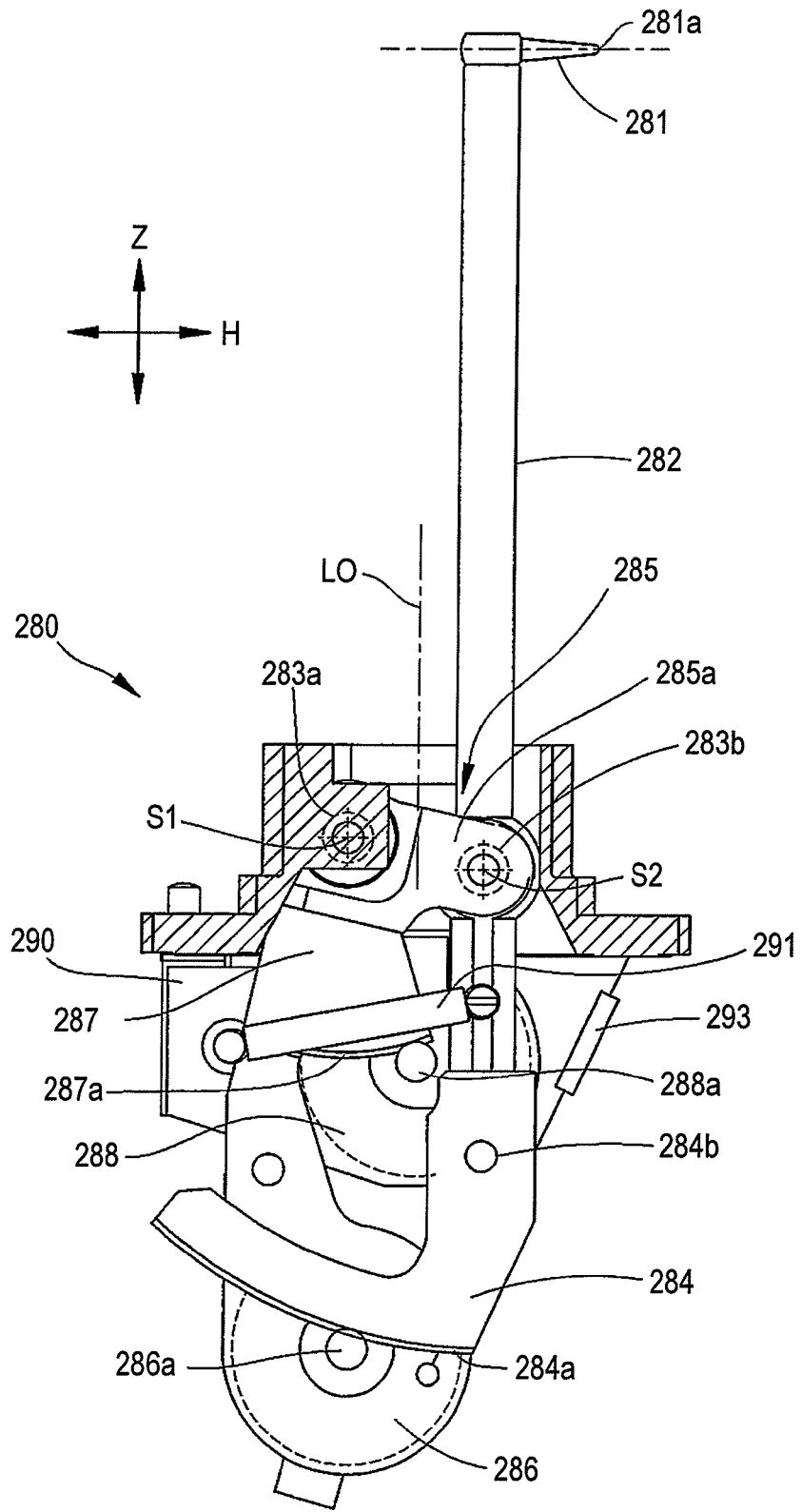
FIG. 8 is a configuration diagram of a VH unit.
Figure 9:
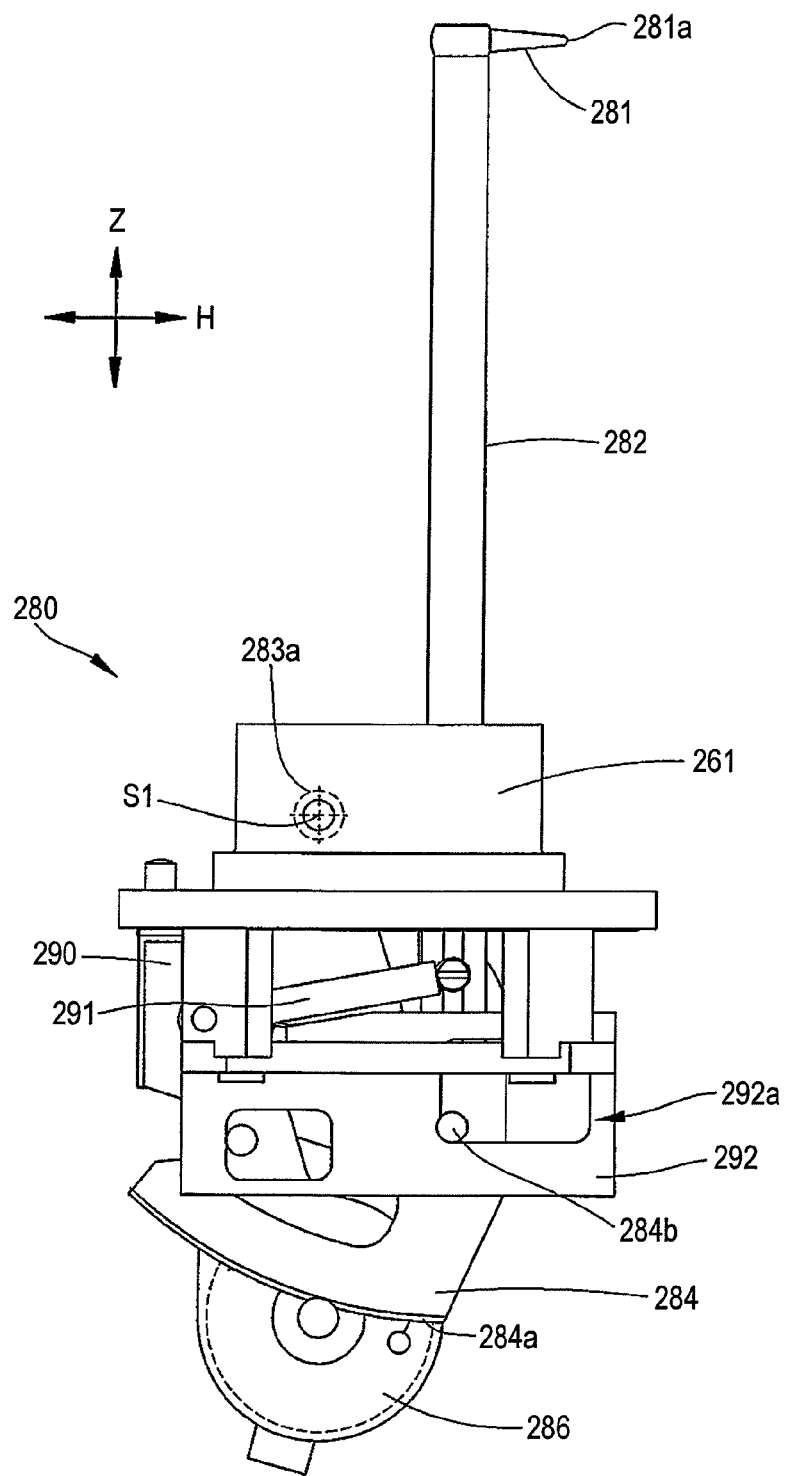
FIG. 9 is a side view of a VH unit.

FIG. 6A is an upward perspective view of the sensor unit 250. FIG. 6B is an explanatory view of the rotation unit 260. FIG. 7 is a perspective view of the VH unit 280. FIG. 8 is a configuration diagram of the VH unit 280. FIG. 9 is a side view of the VH unit 280.

The configuration of the rotation unit 260 will be described. The VH unit 280 shown in FIG. 8 is attached to a rotation base 261 shown in FIG. 6B. The rotation base 261 is held to be rotatable around the center axis LO extending in the Z direction inside a cylindrical holding cover 251 shown in FIG. 6A. The holding cover 251 is attached to the moving base 250*a* which is moved in the Z direction by the Z moving unit 220. As shown in FIG. 6B, a large-diameter gear 262 is formed on the periphery of the lower part of the rotation base 261. Meanwhile, as shown in FIG. 6A, a DC motor 265 is attached to an attachment plate 252 which is attached to the holding cover 251. A pinion gear 266 is fixed to the rotation shaft of the motor 265, and the rotation of the pinion gear 266 is transmitted to the large-diameter gear 262 through a gear 263 which is rotatably provided in the attachment plate 252. Thus, the rotation base 261 rotates around the center axis LO in accordance with the rotation of the motor 265. The rotation of the motor 265 is detected by an encoder (sensor) 265*a* which is attached to the motor 265 as a single body, and the rotation angle of the rotation base 261 (that is, the VH unit 280) is detected from the output of the encoder 265*a*. The origin position of the rotation of the rotation base 261 is detected by an origin position sensor (not shown).

Next, the configuration of the VH unit 280 will be described. The VH unit 280 includes the tracing stylus shaft 282 with the tracing stylus 281 attached to the upper part thereof. The tracing stylus shaft 282 is held to be tiltable in the direction toward which the tracing stylus 281 is directed (an H direction in which the tip end of the tracing stylus 281 and the shaft center of the tracing stylus shaft 282 are connected to each other).

The tracing stylus 281 is formed in a needle shape having a thickness and width to be insertable into the groove of the rim which has a large curvature and is tilted greatly in the Z direction (at equal to or greater than 45 degrees). In this example, in order for the tracing stylus 281 to have strength, the tracing stylus 281 is formed in a shape in which the diameter gradually decreases toward the tip end. A tip end portion 281*a* of the tracing stylus 281 is rounded, and preferably, is formed in a spherical shape. The radius of the spherical shape of the tip end portion 281*a* is of the size to be insertable into the groove of the normal rim, and preferably, is in a range of 0.3 to 0.5 mm. If the radius of the spherical shape is smaller than 0.3 mm, it is difficult to cross a step formed at the joint of the rim. If the radius of the spherical shape is excessively greater than 0.5 mm, when the groove of the rim has a small width, the tip end portion 281*a* is not easily inserted into the groove, and the tracing stylus 281 is likely to stray in measuring the rim with a large change in the Z direction.

Referring to FIGS. 7 and 8, an oscillation base 285 is held to be tiltable in the tip end direction (H direction) of the tracing stylus 281 around a shaft (fulcrum) S1 supported by the rotation base 261 through a bearing 283*a*. The oscillation base 285 has an arm portion 285*a* which extends in the tip end direction of the tracing stylus 281 in FIG. 8. The tracing stylus shaft 282 which extends in the Z direction in FIG. 8 is held by the arm portion 285*a* to be tiltable in the tip end direction of the tracing stylus 281 around a shaft (fulcrum) S2 through a bearing 283*b*. With this configuration, the tracing stylus shaft 282 maintains the tilt angle and is movable in the Z direction with respect to the position (that is, the rotation base 261) of the shaft S1.

In order to further reduce the motion of the tracing stylus shaft 282, it is preferable that the movement range of the tracing stylus 281 in the moving radius direction on the sensor unit 250 is smaller than the movable range of the XY moving unit, and the movement range of the tracing stylus 281 in the Z direction is smaller than the movable range of the Z moving unit. Thus, the following mechanism of the tracing stylus 281 with respect to changes in the rim is reduced in size and weight, and the smooth motion of the tracing stylus 281 is realized.

A gear plate 284 which is used to detect the rotation angle of the tracing stylus shaft 282 with the shaft S2 as a fulcrum is attached to the lower part of the tracing stylus shaft 282 extending downward of the shaft S2. A first encoder (sensor) 286 is attached to the lower part of the oscillation base 285. A pinion 286*a* attached to the rotation shaft of the encoder 286 meshes with a gear 284*a* formed in the gear plate 284. For this reason, the rotation angle of the tracing stylus shaft 282 in the tilt direction (H direction) around the shaft S2 is detected by the encoder 286.

A gear plate 287 which is used to detect the rotation angle with the shaft S1 as a fulcrum is fixed to the oscillation base 285 at a position below the shaft S1. Meanwhile, a fixing block 290 is attached to the lower part of the rotation base 261. A second encoder (sensor) 288 is attached to the fixing block 290. A pinion 288*a* which is attached to the rotation shaft of the encoder 288 meshes with a gear 287*a* formed in the gear plate 287. With this configuration, the rotation angle of the oscillation base 285 around the shaft S1 is detected by the encoder 288. Although in this embodiment, the central axis LO of the rotation of the rotation base 261 in FIG. 8 is set to pass through the center between the shaft S1 and the shaft S2 in a state where the shaft S1 and the shaft S2 are at the same height, the central axis LO may not pass through the center between the shaft S1 and the shaft S2.

In the configuration of the VH unit 280, a second XY position detection unit is constituted by the two encoders 286 and 288 to detect the XY positions of the tracing stylus 281 (the tip end portion 281*a*) with respect to a predetermined reference point (central axis LO) which is set in the sensor unit 250. A third Z position detection unit is constituted by the two encoders 286 and 288 to detect the position of the tracing stylus 281 in the Z direction with respect to the reference point (the height of the fulcrum S1) in the Z direction. Instead of the encoders 286 and 288, a known optical sensor may be used which includes a two-dimensional CCD or two 2 line sensors in combination.

In the VB unit 280 is also provided a measurement pressure application mechanism which applies a measurement pressure to press the tip end of the tracing stylus 281 into the groove of the rim. In the example of FIG. 8, a tension spring 291 serving as an urging member for generating a measurement pressure is arranged between the fixing block 290 and the tracing stylus shaft 282. With the urging of the spring 291, a measurement pressure is constantly applied such that the tracing stylus shaft 282 is tilted in the tip end direction of the tracing stylus 281 around the shaft S2. The measurement pressure application mechanism may use the spring 291 serving as an urging member and a driving source, such as a motor.

In FIG. 8, a pin 284*b* which protrudes in a direction perpendicular to paper of FIG. 8 is fixed to the gear plate 284 which is positioned at the lower part of the tracing stylus shaft 282. The pin 284*b* is used to restrict the tracing stylus shaft 282 so as not to be tilted at equal to or greater than a predetermined angle in the tip end direction of the tracing stylus 281. FIG. 9 is a side view of the VH unit 280 of FIG. 8. A restriction plate 292 is attached to the lower part of the rotation base 261. A contact portion 292*a* with which the pin 284*b* comes into contact is formed in the restriction plate 292. The tracing stylus shaft 282 is urged to be tilted to the right side of FIGS. 8 and 9 with the shaft S2 as a fulcrum. Meanwhile, the pin 284*b* comes into contact with the contact portion 292*a* of the restriction plate 292, such that the tilt of the tracing stylus shaft 282 is restricted. The restriction position is set up to a position where the tracing stylus shaft 282 is substantially in parallel in the Z direction.

A spring 293 serving as an urging member is provided in the VH unit 280 to achieve equilibrium of the gravitational rotation of the oscillation base 285 with the shaft S1 as a fulcrum. One end of the spring 293 is fixed to the rotation base 261, and the other end of the spring 293 is fixed to the downward position of the oscillation base 285. Thus, the movement of the tracing stylus 281 (tracing stylus shaft 282) in the vertical direction (Z direction) following the groove of the rim receives little effect of the gravity and is smoothened. The spring force of the spring 293 is adjusted so that gravity slightly applies downwardly to the tracing stylus shaft 282.

A mechanism which holds the tracing stylus shaft 282 and the tracing stylus 281 in the VH unit 280 to be movable in the Z direction may be a linear motion mechanism (this mechanism is known) constituted by a rail or the like. In this case, such a mechanism is employed which holds the arm portion 285*a* to be linearly movable in the Z direction, the arm portion holding the tracing stylus shaft 282 so as to be inclinable around the shaft S2.

In measuring the template TP (or demo lens) using the template holder 310 shown in FIG. 1, the tracing stylus shaft 282 is also used as a measurement shaft which comes into contact with the edge of the template TP. A portion of the tracing stylus shaft 282 which extends upward from the rotation base 261 has a columnar shape with the shaft center (so) as the center, and a columnar lateral surface comes into contact with the edge of the template TP. In the lateral surface of the tracing stylus shaft 282, a lateral surface in a direction perpendicular to the tip end direction of the tracing stylus 281 mainly comes into contact with the template TP. As the measurement pressure application mechanism which generates a measurement pressure in measuring a template, the rotation unit 260 which rotates the VH unit 280 is also used. If the rotation base 261 is rotated by the DC motor 265 in a state where the tracing stylus shaft 282 stands upright in the vertical direction (Z direction), the lateral surface of the tracing stylus shaft 282 comes into contact with the edge of the template TP. At this time, a predetermined voltage is applied to the motor 265, such that a measurement pressure is applied to the tracing stylus shaft 282. That is, if the tracing stylus shaft 282 comes into contact with the template TP and the sensor unit 250 is moved in the XY direction, a rotation force is applied to the rotation base 261 by the motor 265, such that the tracing stylus shaft 282 is moved to follow changes of the edge of the template TP. The rotation angle of the rotation base 261 is detected by the encoder 265*a*, and the position of the center (So) of the tracing stylus shaft 282 with respect to the rotation canter of the rotation base 261 is detected. As the measurement pressure application mechanism in measuring a template, an urging member, such as a spring, may be used.

Figure 11:
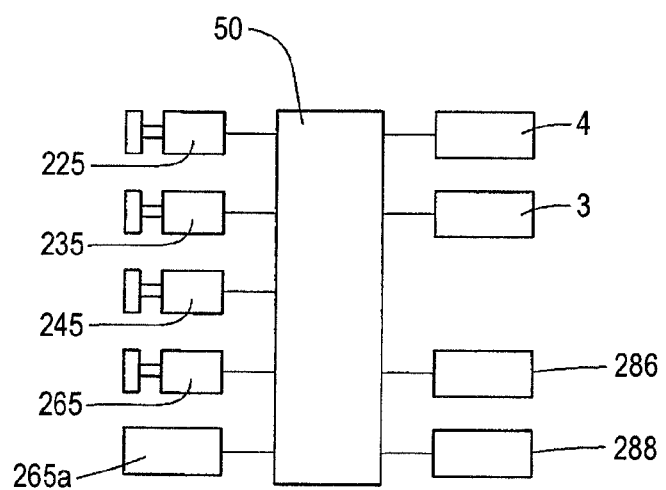
FIG. 11 is a block diagram of a control system of an apparatus.

FIG. 11 is a block diagram of a control system of this apparatus 1. To the controller 50 are connected the panel section 3, the switch section 4, the motor 245 of the X moving unit 240, the motor 235 of the Y moving unit 230, the motor 225 of the Z moving unit 220, the motor 265, the encoders 265*a*, 286, and 288, and the like. To the controller 50 is also connected the driving source of the clamp mechanism of the frame holding unit 100.

Figure 12:
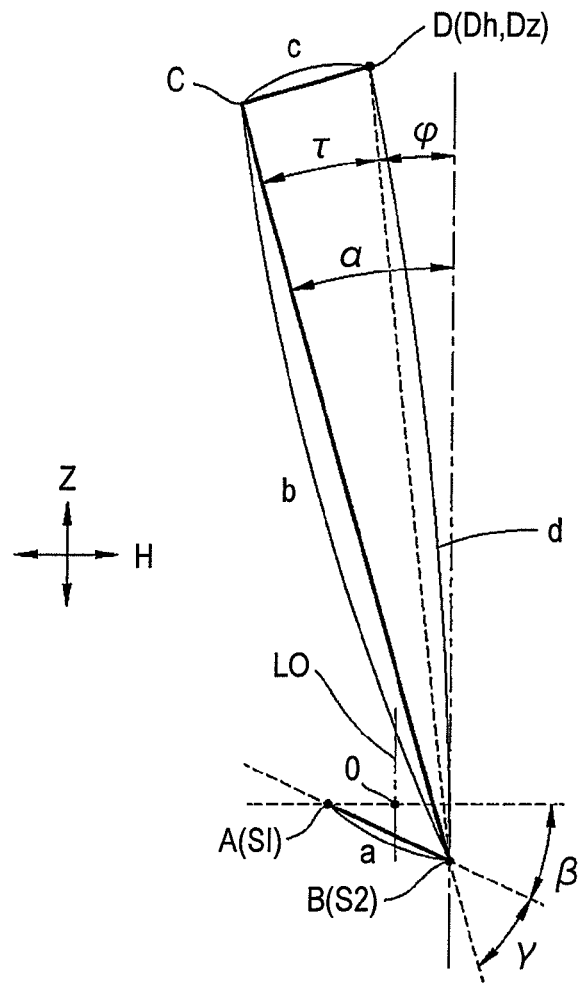
FIG. 12 is an explanatory view of tip end position detection of a tracing stylus.

Next, position detection of the tip end of the tracing stylus 281 which is moved to follow changes in the rim will be described. FIG. 12 is a diagram illustrating position detection of the tip end of the tracing stylus 281.

In FIG. 12, it is assumed that a point A is the fulcrum (S1) of the rotation center of the oscillation base 285, a point B is the fulcrum ($S_2$) of the tilt of the tracing stylus shaft 282, a point D is the tip end of the tracing stylus 281, and a point C is a point at which a vertical line from the point D crosses the axis of the tracing stylus shaft 282. It is assumed that a point O is a reference point set in the sensor unit 250 and a point through which the central axis LO of the rotation base 261 passes from the point A in the tip end direction of the tracing stylus 281. It is assumed that the distance between the point A and the point B is a, the distance between the point B and the point C is b, and the distance between the point C and the point D is c, and the distance between the point B and the point D is d. In this example, it is assumed that the distance from the point A to the point O is a/2. The angle of a line segment BC (tracing stylus shaft 282) with respect to the Z direction is α, the angle of a line segment AB with respect to a direction (H direction) connecting the point A and the point O is β, the angle between the line segment AB and the line segment BC is γ, the angle of a line segment BD with respect to the Z direction is φ, and the angle between a line segment BD and the line segment BC is τ. The angle β is detected by the encoder 288. The angle γ is detected by the encoder 286.

A position Dh of the point D with respect to the point O in the H direction (the direction toward the tip end of the tracing stylus 281 is directed) and a position Dz of the point D with respect to the point O in the Z direction are calculated by the following expressions. In FIG. 12, it is assumed that the right side with respect to the point O is referred to as the plus side in the H direction, the left side with respect to the point O is referred to as the minus side in the H direction, the upper side with respect to the point O is referred to as the plus side in the Z direction, and the lower side with respect to the point O is referred to as the minus side in the Z direction.

[Equation 1]

$$D(Dh, Dz) = (-a/2 + a \cdot \cos\beta - d \cdot \sin\phi, -a \cdot \sin\beta + d \cdot \cos\phi) \quad \text{(Expression 1)}$$

The angles α and φ are calculated as follows.

[Equation 2]

$$\alpha = 90 - \beta - \gamma \quad \text{(Expression 2)}$$

[Equation 3]

$$\phi = \alpha - \tan^{-1}(c/b) = (90 - \beta - \gamma) - \tan^{-1}(c/b) \quad \text{(Expression 3)}$$

Figure 13:
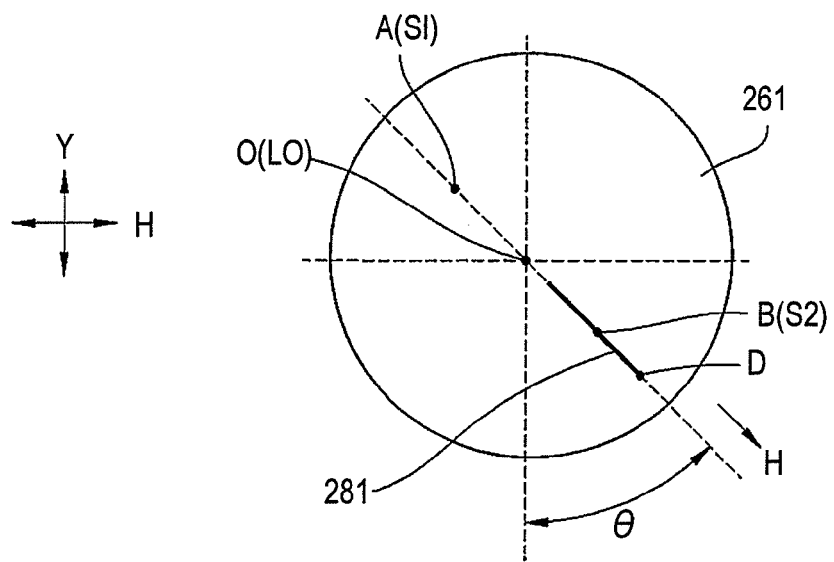
FIG. 13 is an explanatory view when the tip end direction of a tracing stylus is taken into consideration on an XY coordinate system.
Figure 14:
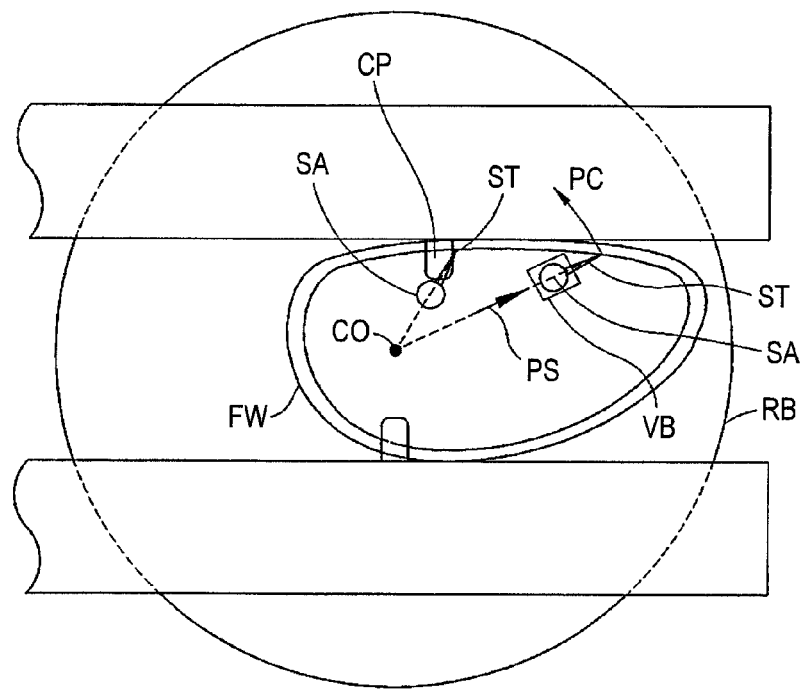
FIG. 14 is an explanatory view of a measurement mechanism of an apparatus of the related art.

FIG. 13 is an explanatory view when the tip end direction (H direction) of the tracing stylus 281 is taken into consideration on the XY coordinate system. Taking into consideration the rotation of the rotation base 261 around the point O on the XY coordinate system of the measurement unit 200, if the angle of the tip end direction (H direction) of the tracing stylus 281 with respect to the Y direction is θ (the angle in the counterclockwise direction in FIG. 13), the position (x,y,z) of the point D based on the point O is expressed by the following expression.

[Equation 4]

$$D(x, y, z) = (Dh \cdot \sin\theta, Dh \cdot \cos\theta, Dz) \quad \text{(Expression 4)}$$

That is, the tip end position of the tracing stylus 281 with respect to the reference position (point O) set in the sensor unit 250 is calculated by Expression 4. In the configuration in which the rotation unit 260 is provided in the sensor unit 250, the angle θ is detected by the encoder 265a. As shown in FIG. 10, when the XY moving unit is constituted by the rotation base 401 and the horizontal moving unit 420, and the sensor unit 250 does not have the rotation unit 260, the tip end direction of the tracing stylus 281 becomes the rotation direction of the rotation base 401. In this case, as a rotation mechanism which changes the tip end direction of the tracing stylus 281, the rotation base 401 and the motor 403 constituting a portion of the XY moving unit are used. Thus, the angle θ of Expression 4 is determined by the rotation angle of the rotation base 401. The rotation angle of the rotation base 401 is obtained from control data of rotation driving of the motor 403.

The reference position (point O) of the sensor unit 250 which is moved by the XY moving unit and the Z moving unit 220 is controlled as the position (x,y,z) with respect to the origin set in the measurement unit 200. Thus, using a moving radius detection unit, which includes the first XY position detection unit and the second XY position detection unit to detect a position of the tracing stylus in the moving radius direction, the tip end position of the tracing stylus 281 is calculated by a combination of the reference point O (X,Y,Z) of the sensor unit 250 with respect to the origin of the measurement unit 200 and the position (x,y,z) of the point D with respect to the reference point O.

Next, a measurement operation of the measurement unit 200 to measure the rim will be described. Hereinafter, for ease of understanding of a method of controlling the measurement unit 200, a measurement operation of the rim in the moving radius direction (XY direction) and a measurement operation of the rim in the Z direction will be described separately.

In measuring the rim in the moving radius direction, the controller 50 determines the XY position for moving the sensor unit 250 on the basis of measured radial information of the rim in the course of measurement, and controls driving of the XY moving unit in accordance with the determined XY position. Preferably, the controller 50 predicts a change in the radius of an unmeasured portion of the rim on the basis of the measured radial information of the rim, and determines the XY position for moving the sensor unit 250 such that the tip end of the tracing stylus 281 moves in accordance with the change in the radius of the unmeasured portion. For example, control is performed such that the tip end of the tracing stylus 281 moves in the tangential direction of the rim. The controller 50 determines the rotation angle of the rotation unit 260 in accordance with the radial information of the unmeasured portion calculated from the measured radial information, and controls the rotation of the rotation unit 260 in accordance with the determined rotation angle. For example, the controller 50 determines the rotation angle of the rotation unit 260 such that the tip end direction of the tracing stylus 281 substantially becomes the normal direction of the rim.

Figure 15:
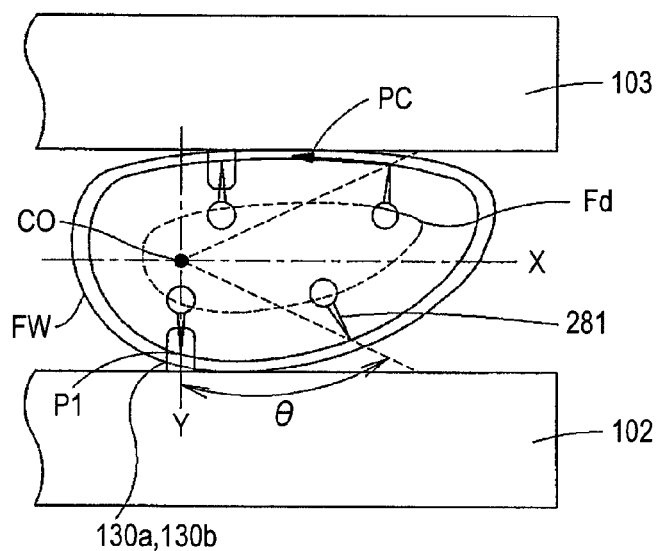
FIG. 15 is a pattern diagram showing the movement state of a tracing stylus.
Figure 16:
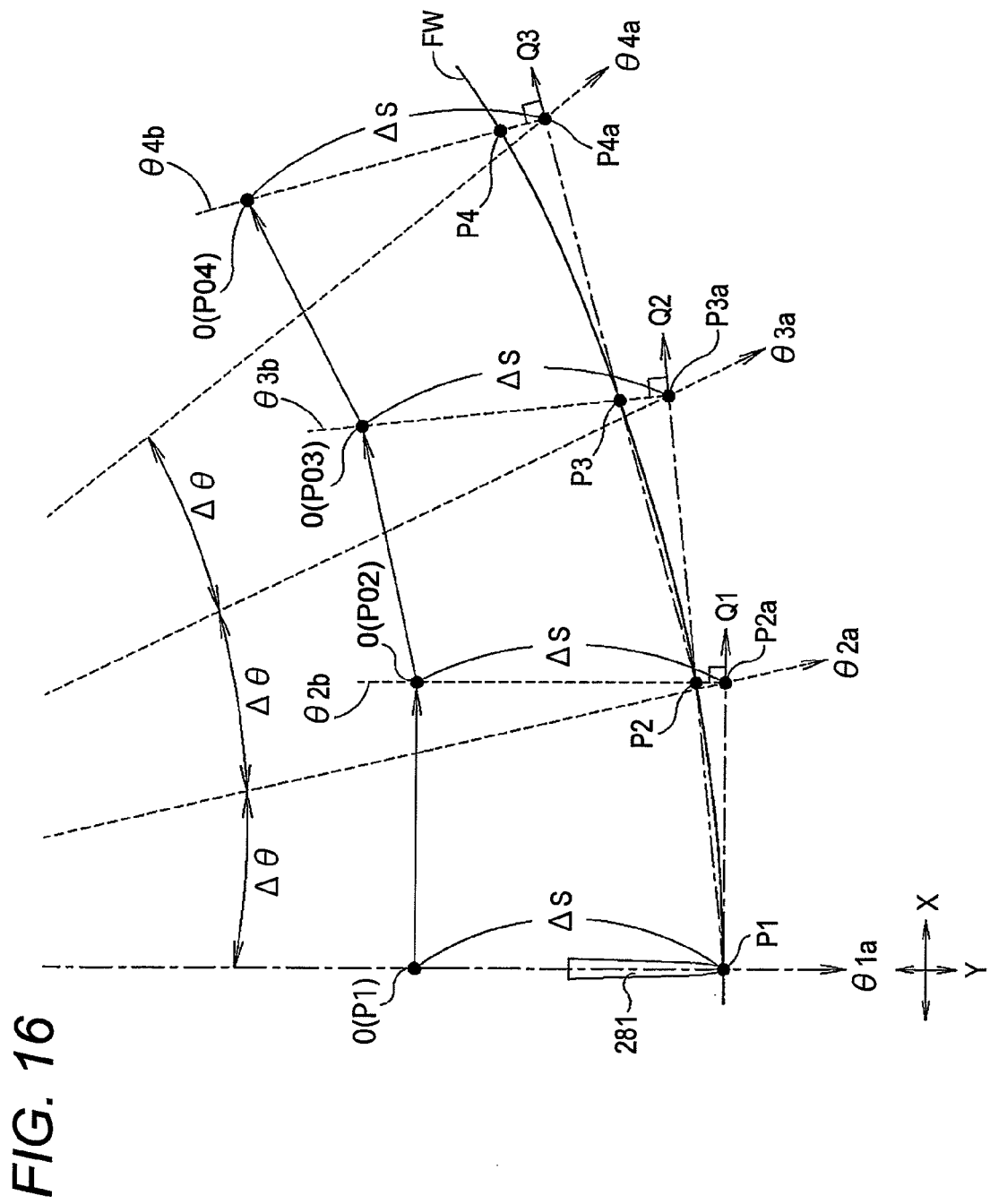
FIG. 16 is a diagram illustrating movement control of the reference point of a sensor unit and control of the rotation direction of a tracing stylus.

FIG. 15 is a schematic view showing the movement state of the tracing stylus 281. FIG. 16 is a diagram illustrating movement control of the reference point O of the sensor unit 250 and rotation control of the tracing stylus 281. In order to describe a characteristic measurement operation in the moving radius direction, it is assumed that the rim has no change in the Z direction.

In FIG. 15, the point CO is a predetermined point set in the rim and is set as the origin position of XY in measuring a rim. The point CO is substantially the center of the rim, held by the frame holding unit 100, in the Y direction, and is set at the position in the Y direction at which the clamp pins 130a and 130b on a measurement start side are positioned. This position is the position at which the XY moving unit corresponds to the rotation center of the rotation base 401 shown in FIG. 10.

In FIG. 16, P1, P2, P3, P4, . . . represent the measurement points of a rim FW when the radial angle is changed by a minute angle Δθ based on the point CO. The measurement points are set as the points which change by the angle Δθ with respect to the point CO, such that, similarly to the related art, the total number of measurement points can be obtained constant. For example, if the angle Δθ is set to be 0.36 degrees, 1000 measurement points are obtained regardless of the radial size of the rim. The point P1 is a measurement start point.

At the time of the start of measurement, the controller 50 rotates the rotation base 261 of the rotation unit 260 such that the tip end direction of the tracing stylus 281 at a retraction position (point CO) (the direction toward which the tip end of the tracing stylus 281 is directed) becomes the Y direction (θ1a) and moves the sensor unit 250 in the Z direction such that the tip end of the tracing stylus 281 is positioned at a predetermined height of the measurement start point P1 (the height of the clamp position of the clamp pins 131a and 131b). Next, the controller 50 drives the XY moving unit to cause the tip end of the tracing stylus 281 to be inserted into the groove of the rim. The tip end of the tracing stylus 281 comes into contact with the groove of the rim and, from this state, the sensor unit 250 is further moved toward the rim, such that the tracing stylus shaft 282 in the vertical state is tilted around the fulcrum S2. The tracing stylus shaft 282 being tilted is detected from the change in the output of the encoder 286, such that the tip end of the tracing stylus 281 being in contact with the groove of the rim is detected by the controller 50. At the measurement start point P1, the tracing stylus shaft 282 moves the sensor unit 250 (the reference point O of the VH unit 280) up to a position tilted by only a predetermined angle α1 (for example, 5 degrees) on the left side of FIG. 8 toward the rim. The tip end position of the tracing stylus 281 at this time is obtained on the basis of XY position information of the sensor unit 250 which is moved by the XY moving unit and detection information of the encoders 286 and 288.

After the tip end of tracing stylus 281 comes into contact with the groove of the rim, the reason why the sensor unit 250 is moved until the tracing stylus shaft 282 is further tilted at the angle α1 is to allow measurement even in a direction, in which the distance from the reference point O increases, at the time of subsequent measurement of the measurement points. In this embodiment, the tracing stylus 281 is inserted into the groove of the rim and then tilted to the left side of FIG. 8 around the fulcrum S2, such that a measurement pressure is applied by the spring 291. If the measurement pressure is generated, the tip end of the tracing stylus 281 can follow changes in the position of the groove of the rim until the tracing stylus shaft 282 is in the vertical state.

At the time of measurement of the next measurement point P2, measured radial information includes only information of the measurement point P1. Thus, the controller 50 predicts that there is the next measurement point P2 at an intersection P2a between the same direction Q1 (the tangential direction of the measurement point P1) as the X direction and a direction θ2a which is changed by a minute angle Δθ with respect to a direction θ1a. The controller 50 calculates an angle θ2b which substantially becomes a tangential direction at a point P2a with respect to the direction Q1, and rotates the rotation unit 250 such that the tip end direction of the tracing stylus 281 becomes the direction θ2b (in the example of FIG. 16, the direction 82a still has the same angle as the direction θ1a at the measurement start point P1), controls driving of the XY moving unit such that the tip end of the tracing stylus 281 moves up to the point P2a, and moves the reference point O of the sensor unit 250 from a position PO1 to a position PO2. The position PO2 is calculated on the basis of the position of the point P2a, the direction θ2b, and the distance ΔS (the distance at which a predetermined distance is set from the reference point O to the tracing stylus 281).

If the reference point O of the sensor unit 250 is moved to the position PO2, a predetermined measurement pressure is applied to the tracing stylus 281 by the spring 291, such that the tip end of the tracing stylus 281 is moved to follow changes in the actual position of the rim. The position of the measurement point P2 is calculated on the basis of XY position information of the position PO2 to which the reference point O of the sensor unit 250 is moved and information (Expression 4 described above) of the tip end position D(x,y) of the tracing stylus 281 obtained by the encoders 286 and 288.

Next, the controller 50 predicts the position of the measurement point P3 with respect to a direction θ3a, which is further changed by the angle Δθ, on the basis of position information of the measured points P1 and P2. For example, it is predicted that the measurement point P3 is approximately positioned at an intersection P3a between an extension direction Q2 of a line passing through the measured points P1 and P2 and the direction θ3a. The controller 50 calculates an angle θ3b which substantially becomes a tangential direction at the point P3a with respect to the direction Q2. The controller 50 rotates the rotation unit 260 such that the tip end direction of the tracing stylus 281 becomes the direction θ3b and moves the reference point O of the sensor unit 250 to a position PO3 such that the tip end of the tracing stylus 281 is moved up to the point P3a. The position PO3 is calculated on the basis of the position of the point P3a, the direction θ3b, and the distance ΔS. The actual position of the measurement point P3 is calculated on the basis of position information of the position PO3 and the detection results of the encoders 286 and 288.

Similarly, the controller 50 calculates a prediction point P4a of the measurement point P4 on the basis of an extension direction Q3 of a line passing through the measured measurement points P2 and P3 and a direction θ4a which is further changed by the angle Δθ with respect to the point P3a. Next, the rotation angle of the rotation base 261 of the rotation unit 260 is controlled such that the tip end direction of the tracing stylus 281 becomes a direction θ4b perpendicular to the direction θ4a, the position PO4 to which the reference point O of the sensor unit 250 is moved is determined on the basis of the position of the point P4a, the direction θ4b, and the distance ΔS, and driving of the XY moving unit is controlled such that the reference point O is moved to the position PO4. Thus, the actual position of the measurement point P4 is measured. Hereinafter, the same control is performed, obtaining radial information of the entire periphery of the rim.

In FIG. 15, a dotted line Fd in the rim FW is the movement trace of the reference point O of the sensor unit 250 and substantially follows the radial shape of the rim FW. With such movement control of the sensor unit 250, the direction in which force PC for moving the tip end of the tracing stylus 281 acts is substantially the direction which follows the radial shape of the rim FW. Thus, excess force is not applied to the rim FW, the rim FW is not deformed, and the tracing stylus 281 is moved smoothly.

Contact is made such that the tip end direction of the tracing stylus 281 substantially becomes the tangential direction with respect to an unmeasured portion of the rim, the radial shape of the rim can be measured accurately compared to a case where the tip end of the tracing stylus 281 comes into contact with the rim FW at an acute angle. Even when a step is formed at the joint of the rim, the tip end of the tracing stylus 281 easily crosses the step, and it is possible to reduce a problem in that the rim may not be measured. Even when the rim has a large curvature, the tracing stylus 281 does not cross the clamp pins at an acute angle, making it possible to perform measurement while avoiding interference with the clamp pins.

Figure 18:
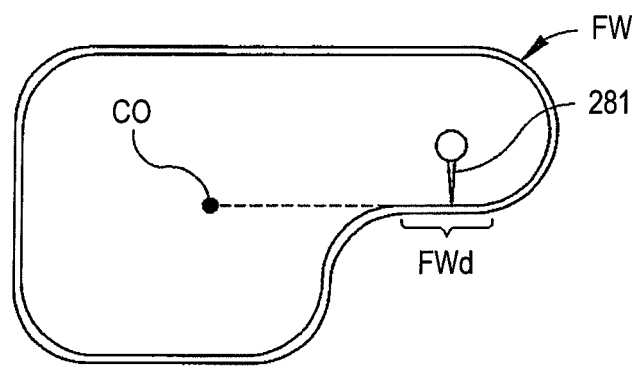
FIG. 18 is an explanatory view of measurement when the shape of a rim is recessed inwardly.

As shown in FIG. 18, even when the shape of the rim FW is recessed inwardly, movement is done such that the tip end direction of the tracing stylus 281 substantially becomes the tangential direction of the rim FW, making it possible to measure a recessed portion FWd. With a measurement method in which the tip end direction of the tracing stylus 281 is directed based on the center CO set in the rim FW, in the recessed portion FWd which follows the extension line of a line connecting the center CO and the tip end direction of the tracing stylus 281, the tracing stylus 281 or the tracing stylus shaft 282 and the rim FW interfere with each other, making it difficult to perform measurement. According to the above-described control method, it becomes possible to measure the recessed portion FWd.

The prediction points P2a, P3a, P4a, . . . may be calculated as the points which are changed from the previous point at a minute distance in the direction of changes in the radius of the rim, instead of being calculated as the points in the direction to be changed by the angle $\Delta\theta$ with respect to the point CO.

Next, a modification concerning the determination of the tip end direction of the tracing stylus 281 will be described with reference to FIG. 17. This modification provides a method in which the rotation angle of the rotation unit 260 is determined in accordance with radial information of an unmeasured portion calculated from the measured radial information, and a method in which the tip end direction of the tracing stylus 281 is determined to be the direction between the moving radius direction based on the center CO and the normal direction of the rim.

Figure 17:
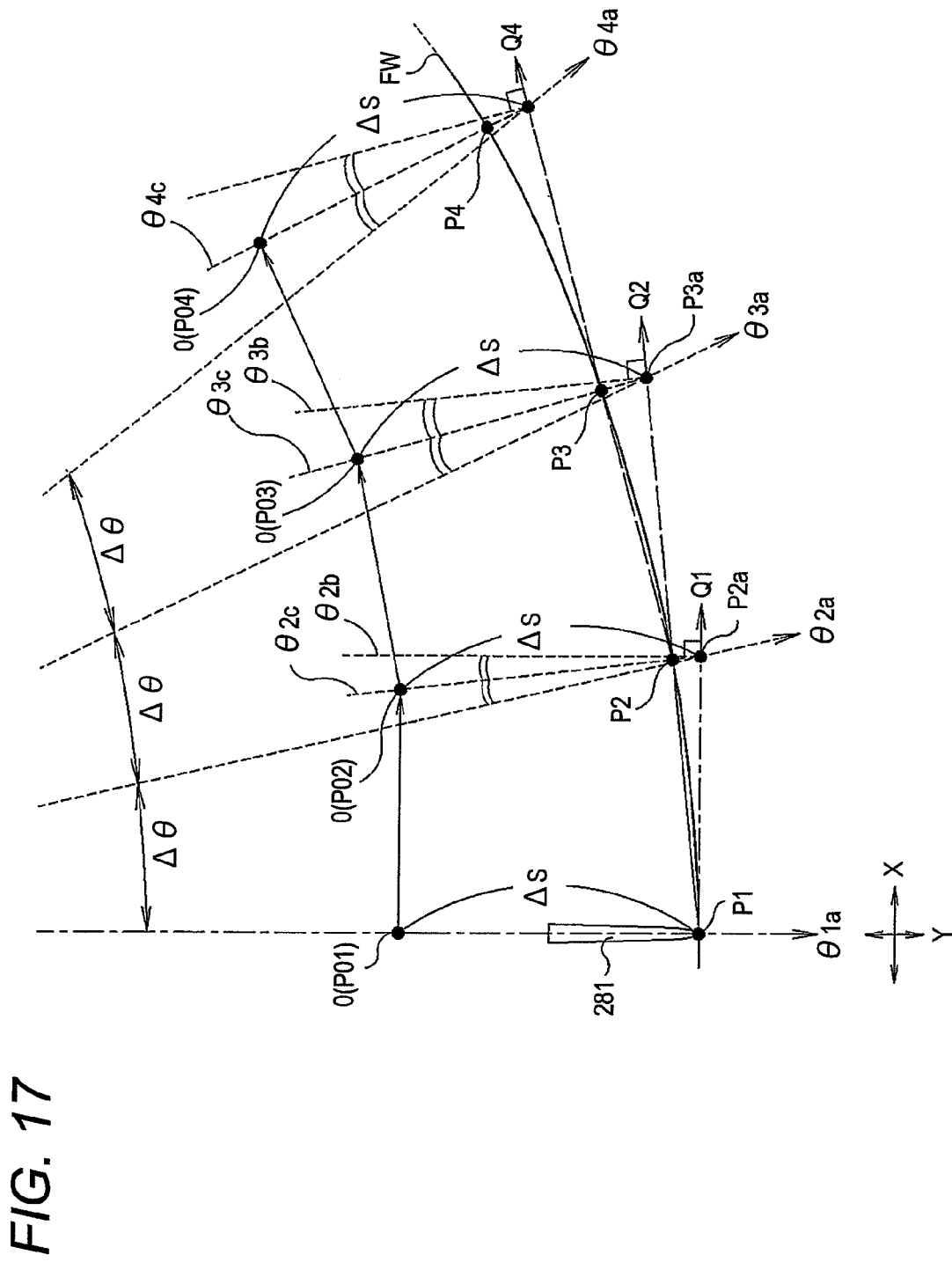
FIG. 17 is an explanatory view of a modification concerning determination of the tip end direction of a tracing stylus.

In FIG. 17, the same parts as those in FIG. 16 are represented by the same reference numerals. Similarly to the foregoing example, the controller 50 calculates the prediction point P2a of the measurement point P2, then calculates an intermediate direction $\theta 2c$ between the normal direction (perpendicular direction) $\theta 2b$ with respect to the direction Q1 and the direction $\theta 2a$ set based on the point CO, and subsequently rotates the rotation unit 260 such that the tip end direction of the tracing stylus 281 becomes the direction $\theta 2c$. The driving of the XY moving unit is controlled such that the reference point O of the sensor unit 250 is moved to the position PO2 away from the point P2a at the distance $\Delta S$ in the direction $\theta 2c$.

Similarly, in measuring the next measurement point P3, the controller 50 calculates the position of the prediction point P3a such that the prediction point P3a is positioned at the intersection between the extension direction Q2 of the line passing through the measured measurement points P1 and P2 and the direction $\theta 3a$. Next, an intermediated direction $\theta 3c$ between the normal direction $\theta 3b$ with respect to the direction Q2 at the prediction point P3a and the direction $\theta 3a$ is calculated, and the rotation unit 260 is rotated such that the tip end direction of the tracing stylus 281 becomes the direction $\theta 3c$. The driving of the XY moving unit is controlled such that the reference point O of the sensor unit 250 is moved to the position PO3 away from the point P3a at the distance $\Delta S$ in the direction $\theta 3c$. Subsequently, similarly, a point at which the next measurement point is positioned is predicted on the basis of the measured radial information, an intermediate direction $\theta c$ between the normal direction $\theta b$ at that point and the moving radius direction $\theta a$ which is changed by the angle $\Delta\theta$ based on the central point CO. The rotation angle of the rotation unit 260 is controlled such that the tip end direction of the tracing stylus 281 is directed toward this direction $\theta c$, and a position to which the reference point O of the sensor unit 250 is moved is determined on the basis of the direction $\theta c$ and the distance $\Delta S$. The XY moving unit is controlled on the basis of the determined position. The intermediate direction $\theta c$ may be an intermediate angle for division at the ratio 5:5 or an angle near the normal direction $\theta b$, for example, for division at the ratio 6:4 or the like.

Figure 19:
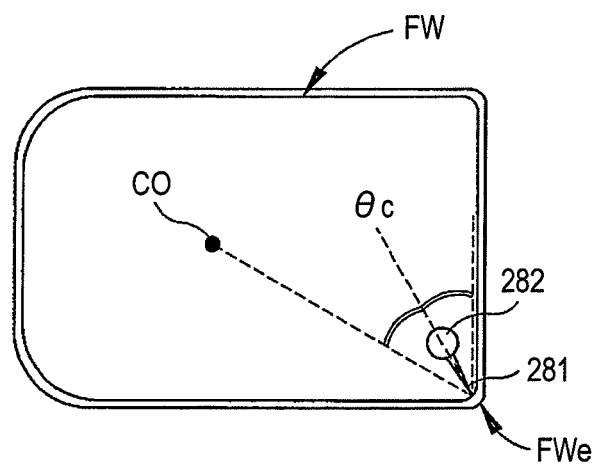
FIG. 19 is an explanatory view of measurement when the shape of a rim has a portion which changes at a near right angle.

With the method of this modification, for example, as shown in FIG. 19, even when the shape of the rim FW has a portion FWe which is changed at near a right angle, measurement becomes possible. As in the foregoing example, if the tip end direction of the tracing stylus 281 is constantly directed to the normal direction with respect to the shape of the rim FW, in measuring the change portion FWe at a right angle, the tracing stylus shaft 282 may interfere with the rim FW. In contrast, with the method which controls the tip end direction of the tracing stylus 281 to the intermediate direction $\theta c$, it is possible to reduce the above-described problem. It is also possible to cope with the measurement of the rim having a recessed portion shown in FIG. 18 and to measure the rim accurately.

With regard to the determination of the tip end direction of the tracing stylus 281, various modifications other than the above-described modification may be made. For example, the moving radius direction $\theta a$ based on the point CO may define the tip end direction of the tracing stylus 281. In this case, the shape of an unmeasured portion of the rim is predicted on the basis of the radial shape of the rim, and the sensor unit 250 is moved in the XY direction such that the tip end of the tracing stylus 281 is moved to follow the shape of the unmeasured portion (including a case where the tip end of the tracing stylus 281 is moved in the tangential direction of the rim). Thus, there is no case where excess force is applied to the rim, and it is possible to reduce deformation of the rim, accurately performing measurement. With this method, complex calculation is not required for determining the rotation angle of the rotation unit 260, making it possible to perform rapid measurement.

Regarding the determination of the tip end direction of the tracing stylus 281, it possible to change the determination methods during the measurement of the rim depending on the shape of a part of the rim to be measured, the determination methods including the method of directing toward the normal direction, the method of directing toward the moving radius direction, and the method of directing between the normal direction and the moving radius direction.

Incidentally, as shown in FIG. 10, when the XY moving unit is constituted by the rotation base 401 and the horizontal moving unit 420, no rotation unit 260 is provided in the sensor unit 250, measurement is possible while reducing deformation of the rim, and the apparatus configuration is simplified. In FIG. 10, the tip end of the tracing stylus is directed toward the radius direction in which the horizontal moving unit 420 moves, while the rotation center CO of the rotation base 401 being as the reference point.

Although in the above description, with regard to the prediction of changes in the radius of an unmeasured portion of the rim, a line approximately passing previous two points is used, a curve calculated from three or more measured points may be used. With regard to the prediction of changes in the radius of an unmeasured portion of the rim, the following case is also included. For example, after the actual radial information of the rim is obtained at the point P2, with regard to the measurement of the next measurement point P3, control is performed such that the tip end of the tracing stylus is moved by a change in the radius of the point P2 with respect to the point P1.

A prediction point at which the measurement point P4 next to the measurement point P3 is positioned is calculated on the basis of the radial information of the measured rim while the measurement points P1 and P2 are obtained, thereby controlling the XY moving unit. After the measurement point P2 is obtained, the position of the prediction point for the measurement point P4 may be corrected and the XY moving unit may be driven and controlled. With the use of radial information of two or more previous measurement points, the next XY position is determined on the basis of the measurement result of the previous measurement point, achieving smooth movement of the sensor unit 250.

With regard to the above-described measurement of the radial shape of the rim, a configuration of the moving unit 220 is not necessarily provided in which the sensor unit 250 is moved in the Z direction, and as in JP-A-2000-314617 and the like, the tracing stylus shaft 282 may hold to be movable to follow changes in the position of the groove of the rim over the entire measurement range in the Z direction by a linear motion mechanism. However, in order to achieve the smooth movement of the tracing stylus 281 which follows the rim and to perform measurement more accurately, it is preferable that the sensor unit 250 is also configured to be moved in the Z direction. In order that the tracing stylus 281 is unlikely to drop out of the groove of the highly curved rim having a large curvature, the tracing stylus shaft 282 (tracing stylus 281) is tilted depending on the curvature of the rim.

Next, a measurement operation of the rim in the Z direction will be described. Hereinafter, description will be provided focusing on an operation to reduce the tracing stylus 281 dropping out of the rim and to perform measurement accurately even when a highly curved frame is measured.

In measuring a rim, the controller 50 controls the Z moving unit 220 on the basis of the position of the measured rim in the Z direction to move the sensor unit 250 in the Z direction. The controller 50 controls movement of the XY moving unit (240 and 230) in accordance with the Z position of the measured rim such that the tilt angle of the tracing stylus 281 which is pressed into the groove of the rim follows the tilt of the rim. At this time, it is preferable that changes in the height of the unmeasured portion (next measurement point) is predicted on the basis of the height information of the measured rim, and the XY position and the Z position of the sensor unit 250 are controlled in accordance with the predicted height such that the tilt of the tracing stylus 281 in the Z direction follows the tilt of the rim.

Figure 20:
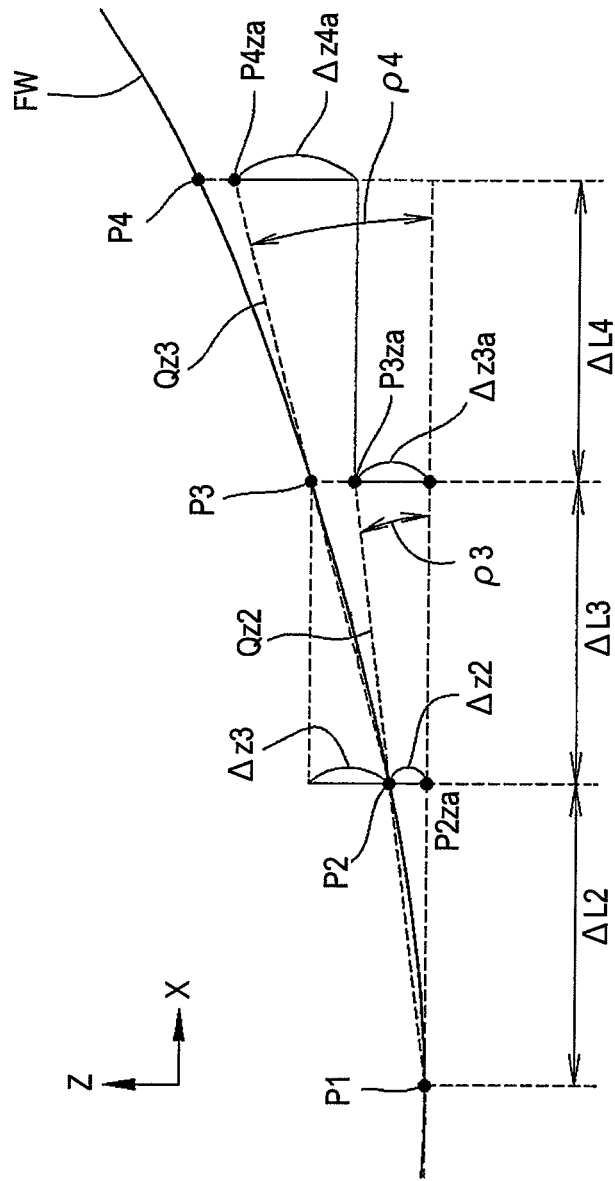
FIG. 20 is an enlarged view showing the curvature state of a rim and each measurement point in the Z direction.
Figure 21:
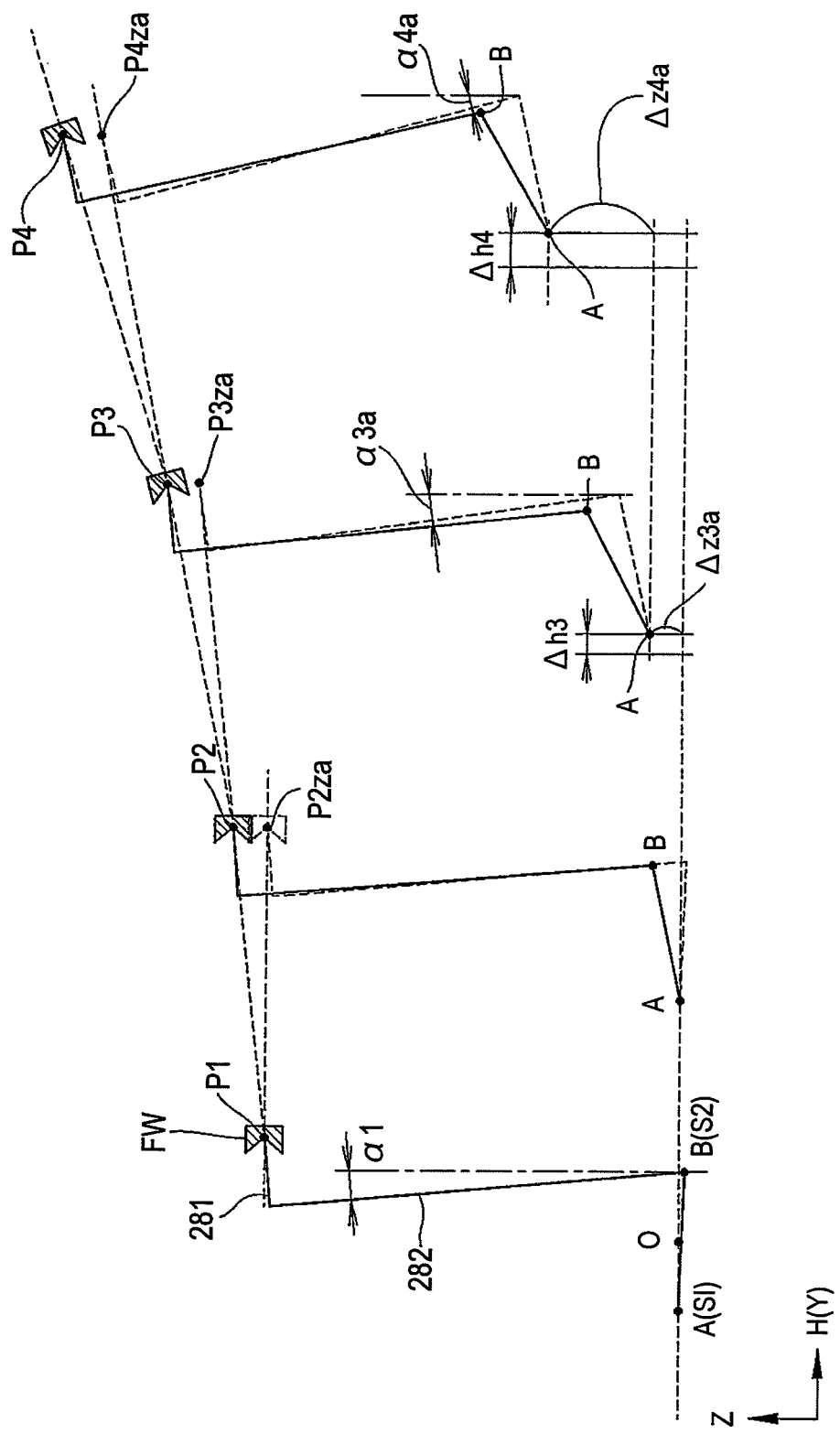
FIG. 21 is a diagram showing the section of a rim at a prediction point for each measurement point in the Z direction and the tilt states of a tracing stylus and a tracing stylus shaft.

FIG. 20 is an enlarged view showing the curvature state of the rim FW and each measurement point in the Z direction when the rim is viewed from the Y direction (the direction perpendicular to the XZ direction). FIG. 21 is a diagram showing the section of the rim FW at the prediction point for each measurement point in the Z direction and the tilt states of the tracing stylus 281 and the tracing stylus shaft 282. For convenience of description, it is assumed that movement control of the sensor unit 250 (reference point O) in the XY direction is referred to as a second method (a control method in which the tip end direction of the tracing stylus is directed in substantially the normal direction of the rim). In FIG. 20, it is assumed that the radius of each of the measurement points P1 to P4 of the rim FW includes only a change in the X direction, and there is no change in the Y direction.

In measuring the measurement start point P1, the controller 50 aligns the angle θ in the tip end direction of the tracing stylus 281 with the Y direction, then positions the tip end of the tracing stylus 281 at a predetermined height of the measurement start point P1, and subsequently inserts the tip end of the tracing stylus 281 into the groove of the rim. At this time, changes in the tip end direction of the tracing stylus 281 are predicted, and as shown in FIG. 21, the tracing stylus shaft 282 moves the sensor unit 250 (reference point O) in the Y direction up to the position, at which the tracing stylus shaft 282 is tilted at the initial angle α1 (for example, 5 degrees), at the point P1 such that the tracing stylus shaft 282 does not reach the limit of movement. To allow the position of the tracing stylus 282 in the Z direction to be movable to follow the variation of the rim in the Z direction, after the tracing stylus 281 is inserted into the groove of the rim, the controller 50 controls the driving of the motor 225 to move the sensor unit 250 downwardly. Preferably, the position to which the sensor unit 250 is moved downwardly is a position in which the shaft S2 of the tracing stylus shaft 282 is located at a substantially a middle of the movable range in the Z direction.

Subsequently, in order to measure the next measurement point P2, the sensor unit 250 is moved in the XY directions. With regard to the next measurement point P2, it is assumed that a prediction point P2za is at the same height as the point P1, and the Z position of the sensor unit 250 is not changed and the sensor unit 250 is moved in the XY directions. The position of the actual measurement point P2 is obtained on the basis of position information (X,Y,Z) of the reference point O of the sensor unit 250 and detection information (x,y,z) based on the detection results of the encoders 286 and 288. The distance ΔL2 from the point P1 and the point P2 is calculated on the basis of the XY positions of the point P1 and the point P2. The difference between the prediction point P2za and the actual measurement point P2 is Δz2.

After the Z position of the measurement point P2 is obtained, the Z position of the next measurement point is predicted on the basis of position information of the measured points P1 and P2. For example, it is predicted that a prediction point P3za for the next measurement point P3 is in an extension line direction Qz2 connecting the Z position of the measured point P1 and the Z position of the point P2 at a position away from at a distance ΔL3 (calculated from the prediction points P2a and P3a in the XY directions). The amount of displacement in the Z position of the prediction point P3za with respect to the previous prediction point P2za is Δz3a. If ΔL2 and ΔL3 approximately have the same value, Δz3a is calculated by 2×Δz2. The angle of the direction Qz2 with respect to the X axis at this time is ρ3. The angle ρ3 is obtained on the basis of the distance ΔL2 and the Z position (Δz2) of the point P (tan ρ3=Δz2/ΔL2).

The controller 50 drives the motor 235 of the Z moving unit 220 on the basis of the Z position of the prediction point P3a and moves the sensor unit 250 in the Z direction by Δz3a. The groove of the rim has a curvature according to changes in the Z position, such that the tilt angle of the tracing stylus 281 which is inserted into the groove of the rim is changed depending on the curvature. The tilt angles of the tracing stylus 281 and the tracing stylus shaft 282 are determined on the basis of the angle ρ3 of the prediction point P3za. In measuring the point P3za, the angle at which the tracing stylus shaft 282 is tilted with respect to the Z axis is α3a. Although the angle ρ3 is used as the angle α3a as it is, predicting changes of the actual measurement point P3 in the vertical direction, as in measuring the measurement point P1, a value at which the tracing stylus shaft 282 does not reach the limit of movement is taken into consideration. For example, the angle α3a is set to be a value obtained by adding the previous angle α1 to the angle ρ3. Alternatively, the angle α3a is set to be a value obtained by multiplying the angle ρ3 by a predetermined correction coefficient k.

When the tip end of the tracing stylus 281 is placed at the position of the prediction point P3za, the controller 50 moves the point A (reference point O) of the sensor unit 250 by a movement amount Δh3 in the tip end direction of the tracing stylus 281 with respect to the position of the measurement point P2 such that the tracing stylus shaft 282 is tiled at the angle α3a (see FIG. 21). The movement amount Δh3 is calculated by calculation using the angle α3a, the distance between the point A and the point B shown in FIG. 12, the distance between the point B and the point C, the distance between the point C and the point D, and the distance between the point B and the point D.

Figure 22:
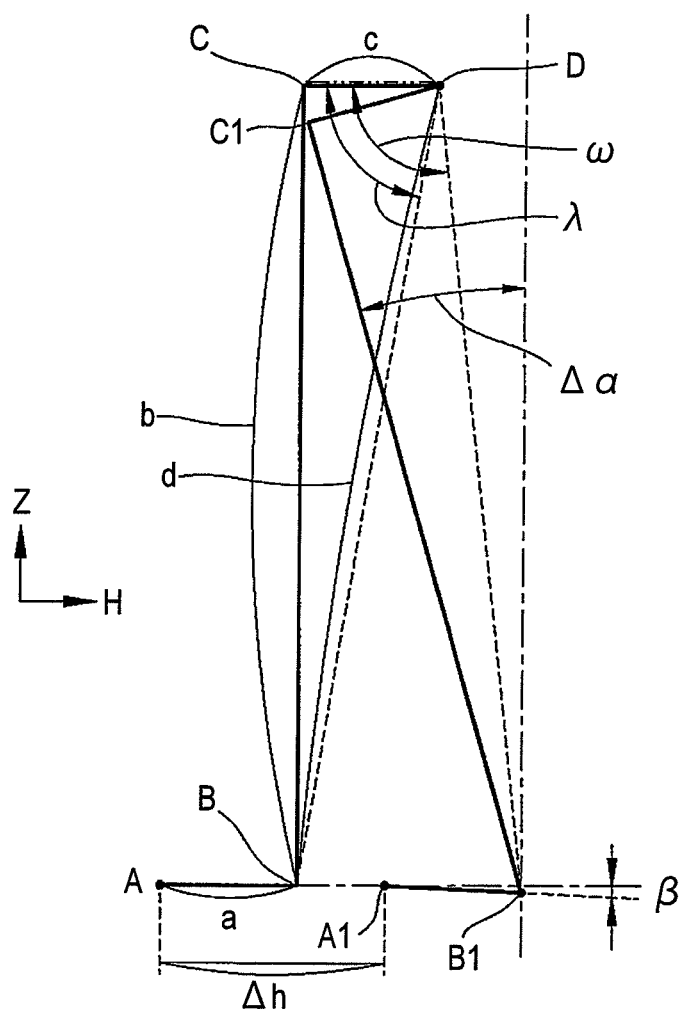
FIG. 22 is a diagram illustrating a way of calculating the movement amount of a tracing stylus shaft when the tracing stylus shape is tilted.

FIG. 22 is a diagram illustrating a way of calculating the movement amount of the tracing stylus shaft 282 when the tracing stylus shaft 282 is tilted at an angle Δα with respect to the Z direction. FIG. 22 shows a state where, if the tracing stylus shaft 282 is in the vertical state (the Z direction), the position of a tip end point D of the tracing stylus 281 is not changed, the point A when the tracing stylus shaft 282 is in the vertical state (Z direction) is moved in the tip end direction (H direction) of the tracing stylus 281, and the tracing stylus shaft 282 is tilted by the angle Δα. As in FIG. 12, the distance between the point A and the point B, the distance between the point B and the point C, the distance between the point C and the point D, and the distance between the point B and the point D are referred to as a, b, c, and d, respectively. When the tracing stylus shaft 282 is tilted by the angle Δα, the movement point of the point A is A1, the movement point of the point B is B1, and the movement point of the point C is C1. The angle between the line segment CD and the line segment BD is λ, and the angle between the line segment CD and the line segment B1D is ω. The rotation angle of the point B toward the point B1 based on the point D is Δα, such that the angle λ and the angle ω are calculated as follows.

[Equation 5]

$$\lambda = \tan^{-1}(c/b) \qquad \text{(Expression 5)}$$

[Equation 6]

$$\omega = \lambda + \Delta\alpha \qquad \text{(Expression 6)}$$

If the distance from the point B1 to the point D in the H direction is DB1h and the distance from the point B1 to the point D in the Z direction is DB1z, DB1h and DB1z are calculated by the following expression.

[Equation 7]

$$DB1h = d \cdot \sin(180-\omega) \qquad \text{(Expression 7)}$$

[Equation 8]

$$DB1z = d \cdot \cos(180-\omega) \qquad \text{(Expression 8)}$$

If the distance from the point B1 to the point B in the Z direction is BB1z, BB1z is calculated by the following expression.

[Equation 9]

$$BB1z = d \cdot \cos(180-\omega) - b \qquad \text{(Expression 9)}$$

If the tilt angle of the line segment BB1 with respect to the H direction is β, β is calculated by the following expression.

[Equation 10]

$$\beta = \sin^{-1}\left(\frac{d \cdot \cos(180-\omega) - b}{a}\right) \qquad \text{(Expression 10)}$$

Thus, the movement amount αh of the point A1 from the point A is calculated by the following expression from the drawing.

[Equation 11]

$$\Delta h = a + c + d \cdot \sin(180-\omega) - a \cdot \cos\beta \qquad \text{(Expression 11)}$$

In Expression 11, if ω and β are expanded using Expressions 10, 6, and 5, Δh is expressed by the known distances a, b, c, and d and the angle Δα.

If the angle α3a is determined based on the way of thinking a method of calculating the movement amount Δh with respect to Δα, the movement amount Δh3 is also calculated by calculation.

Returning to the description of FIGS. 20 and 21, if the tracing stylus shaft 282 is tilted at the angle α3a, the tip end direction of the tracing stylus 281 is also tilted, and the tip end of the tracing stylus 281 is inserted into the rim so as to follow the curvature of the rim. Thus, even in measuring a highly curved frame, the tracing stylus 281 is unlikely to drop out of the groove of the rim. Measurement can also be performed accurately.

If the sensor unit 250 is moved from the position of the measurement point P2 by the distance ΔL3 in the XY directions, the XYZ position of the actual measurement point P3 is measured. The amount of displacement in the Z position of the measurement point P3 with respect to the measurement point P2 is Δz3. After the Z position of the measurement point P3 is obtained, the Z position of the next measurement point P4 is predicted on the basis of position information of the measured points P2 and P3. It is predicted that the prediction point P4za of the next measurement point P4 is in an extension line direction Qz3 connecting the Z positions of the point P2 and the point P3 at a position away from the point P3 at a distance ΔL4. The distance ΔL4 is calculated from the measurement point P3 and the prediction point P4a in the XY directions. The amount of displacement in the Z position of the prediction point P4za with respect to the previous prediction point P3a is Δz4a. If ΔL3 and ΔL4 approximately have the same value, Δz4a is obtained by (2×Δz3−Δz2).

The angle of the direction Qz3 with respect to the X axis at this time is ρ4. The angle ρ4 is obtained on the basis of the distances ΔL3 and Δz3 (tan ρ4=Δz3/ΔL3).

The controller 50 moves the position of the sensor unit 250 when having been moved in the Z direction at the previous measurement point P3 by Δz4a in the Z direction on the basis of the position of the prediction point P4za (see FIG. 21). Movement is done from the position based on the measurement point P1 by an amount obtained by adding Δz3 to the difference between the previous measurement point P3 and the measurement point P1.

In measuring the prediction point P4za, the angle at which the tracing stylus shaft 282 is tilted is α4a. As described above, the angle α4a may be determined by a value obtained by adding the previous angle α1 to the angle ρ3 or a value obtained by multiplying the angle ρ3 by a predetermined correction coefficient k. The movement amount Δh4 when the sensor unit 250 is moved in the tip end direction (H direction) of the tracing stylus 281 is calculated in the same manner as described above such that the tracing stylus shaft 282 is tilted at the angle α4a. The sensor unit 250 is moved on the basis of the calculated movement amount αh4. The movement amount of the sensor unit 250 for tilting the tracing stylus shaft 282 at the angle α3a, α4a, or the like may be calculated by calculation or control may be performed such that the sensor unit 250 is moved in the H direction until the output of the encoder 286 which detects the tilt angle of the tracing stylus shaft 282 becomes the angle α3a, α4a, or the like.

Subsequently, similarly, the controller 50 predicts the Z position of the next measurement point on the basis of the Z position of the measured measurement point, determines the movement amount for moving the sensor unit 250 in the Z direction on the basis of the prediction point, and controls the motor 255 of the Z moving unit 220. The insertion angle of the tracing stylus 281 is determined so as to match the curvature of the rim on the basis of the Z position of the measured measurement point, the tracing stylus shaft 282 is tilted on the basis of the determined angle, and each motor of the XY moving unit (240 and 230) is controlled to move the sensor unit 250 in the tip end direction (H direction) of the tracing stylus 281.

In predicting changes in the Z position of an unmeasured portion based on changes in the measured Z position of the rim, it may be simply determined to be a difference from the previous measurement point. That is, after the Z position of the actual rim at the measurement point P2 is obtained, in measuring the next measurement point P3, the sensor unit 250 is moved in the Z direction by the difference Δz2 from the previous measurement point (the difference between the measurement points P1 and P2). When there is a margin in the range of changes of the tracing stylus shaft 282 in the Z direction, in predicting changes in the Z position of an unmeasured portion, it may be simply determined to be the same as the Z position at the last-measured measurement point or near the last-measured measurement point. The tilt angle of the tracing stylus shaft 282 may be determined to be an angle which is predefined in accordance with changes in the Z position (changes in height) of the last measurement point from the position of the measurement start point P1. In view of above, the tilt angle of the tracing stylus is determined so that the tilt angle increases as the position of the measuring point with respect to the measurement starting point (the reference position of the frame holding unit 100) becomes high.

With the above-described control, in the case of a highly curved frame, measurement is performed while the tracing stylus 281 does not drop out of the groove of the rim. The sensor unit 250 is moved in the Z direction in accordance with the Z position of the groove of the rim, and also the sensor unit 250 is moved in the XY directions such that the tilt angle when the tracing stylus 281 is inserted into the groove of the rim matches the curvature of the frame. Thus, the changeable range in the Z direction of the tracing stylus 281 which follows the position of the groove of the rim may be small. For this reason, with regard to a mechanism which covers the entire range of changes in the Z direction with the tilt of the tracing stylus shaft (an arm having a tracing stylus), it is possible to shorten the length of the tracing stylus shaft 282 and to reduce the weight of the VH unit 280 serving as a following mechanism of the position of the groove of the rim. If the following mechanism by the tracing stylus 281 can be reduced in weight, smoother movement of the tracing stylus 281 becomes possible, accurately performing measurement.

It should suffice that there is a margin in the following range of the tracing stylus 281 in the Z direction, and the tilt angle when the tracing stylus 281 is inserted into the groove of the rim substantially matches the curvature of the frame. For this reason, position control of the sensor unit 250 in the Z direction and control of the tilt angle of the tracing stylus shaft 282 are performed at an interval of three or five measurement points, instead of each time the sensor unit 250 is moved to the next measurement point in the XY directions.

Although in FIGS. 20, 21, and the like, for ease of understanding and simplification of the measurement operation in the Z direction, there is no change in the Y direction at the measurement points P1, P2, P3, and P4 of the rim, in the case of actual measurement, control is performed in combination with XY control in measuring the radial shape of the rim. That is, changes in the XY position necessary for tilting the tracing stylus shaft 282 are further added to the XY position of the sensor unit 250 which is determined on the basis of the measured radial shape of the rim.

Data of the measured three-dimensional shape of the rim is stored in a memory which is provided in the controller 50. If the measurement of one rim ends, the sensor unit 250 is moved back to the initial position, is moved down to the retraction position, and is moved to the initial position of the other rim in the X direction. Thereafter, the same control is performed to measure the three-dimensional shape of the other rim.

With regard to the above-described configuration and control for accurately measuring the shape of the rim in the Z direction, it is not necessary to provide the above-described measurement mechanism of the radial shape of the rim and control, and the measurement mechanism of the radial shape of the rim and control may be the same as in the related art.

Figure 23:
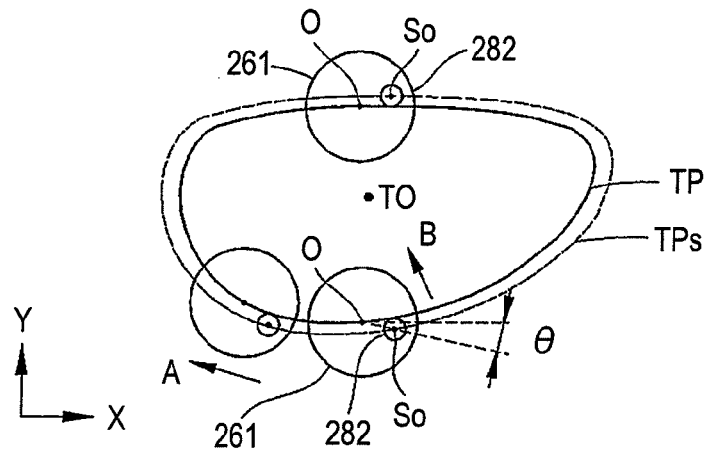
FIG. 23 is a diagram showing the movement state of a tracing stylus shaft and a reference point of a sensor unit in measuring a template.

Next, a measurement operation of the template TP will be described. FIG. 23 is a diagram schematically showing the movement states of the center So of the tracing stylus shaft 282 and the reference point O of the sensor unit 250 in measuring the template TP. The template TP attached to the template holder 310 is placed at the central position of the moving unit 210 in parallel to the XY plane by the attachment portion 300.

In measuring the template TP in the XY directions (radial information), the controller 50 controls the XY moving unit on the basis of the radial information of the measured template TP to move the sensor unit 250 in the XY directions. At this time, it is preferable that the controller 50 predicts radial changes of an unmeasured portion on the basis of the radial information of the measured template TP, and moves the sensor unit 250 in the XY directions in accordance with the predicted radial changes. The radial information of the template TP is obtained on the basis of movement information of the sensor unit 250 in the XY directions and detection information of the rotation angle of the rotation base 261 which changes to follow the radial changes of the template TP.

In FIG. 23, if a template measurement start signal is input, at the time of the start of measurement, the controller 50 positions the reference point O of the sensor unit 250 at a predetermined position away from the template TP in the Y direction of the attachment center TO of the template TP, and controls the Z moving unit 220 to move up the tracing stylus shaft 282 at the retraction height such that the central portion of the tracing stylus shaft 282 in the Z direction is positioned at the height of the template TP. At this time, the motor 265 which rotates the rotation base 261 is controlled such that the tip end direction of the tracing stylus 281 is parallel to the X axis.

Figure 24:
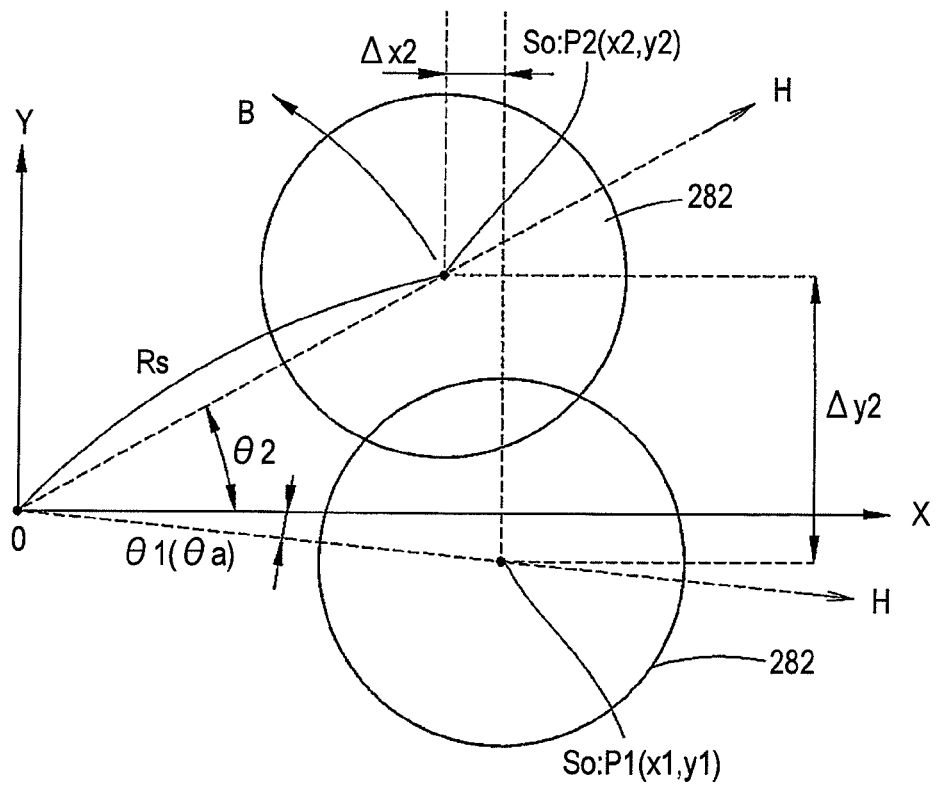
FIG. 24 is a diagram illustrating a way of finding a measurement point in measuring a template.

Thereafter, the sensor unit 250 is moved in the Y direction such that the center O of the sensor unit 250 is directed toward the center TO of the template TP. After the tracing stylus shaft 282 comes into contact with the edge of the template TP, if the sensor unit 250 is further moved in the Y direction, the tracing stylus shaft 282 cannot be moved in the Y direction from the contact position of the template TP. For this reason, the rotation base 261 rotates around the central axis LO (reference point O). Changes in the rotation angle of the rotation base 261 are detected by the encoder 265a, such that the tracing stylus shaft 282 coming into contact with the template TP is detected. The controller 50 moves the sensor unit 250 in the Y direction until the rotation angle θ (in this case, description is provided as to a case where the rotation angle θ is the angle with respect to the X direction) of the tracing stylus shaft 282 in the tip end direction becomes a predetermined angle θa (for example, 5 degrees). The controller 50 obtains the point P1, at which the central point So of the tracing stylus shaft 282 at this time is positioned, as a measurement point at the time of the start of measurement. At this time, as shown in FIG. 24, the XY coordinate position of the point P1 is obtained from the coordinate position (X,Y) of XY movement of the reference point O serving as the rotation center of the rotation base 261 and the xy coordinate (x1,y1) of the central point So of the tracing stylus shaft 282 with respect to the reference point O. The xy coordinate (x1,y1) of the point So with respect to the reference point O is calculated through computation of a trigonometric function on the basis of the distance Rs (this is known at the time of design) between the point O and the central point So, and the rotation angle θ1 (θa at the measurement point P1) with respect to the X axis.

Next, in order to measure the next measurement point, as in measuring the radial information of the rim, the controller 50 moves the sensor unit 250 (reference point O) in the XY directions at a distance corresponding to the rotation at the minute angle Δθ(the rotation angle based on the center TO) on the basis of the measured measurement point. In measuring the template, the sensor unit 250 is moved in a direction indicated by an arrow A (FIG. 23) which is a direction opposite to the tip end direction of the tracing stylus 281. In measuring the measurement point P2 (not shown in FIG. 21) next to the measurement start point P1, it is determined that the measurement point P2 is in a direction parallel to the X direction, the sensor unit 250 is moved in the X direction. With this movement, if the radius of the template TP is changed in the Y direction, the tracing stylus shaft 282 follows the change because of a measurement pressure applied by the motor 265, and the central point So of the tracing stylus shaft 282 is rotated around the reference point O. In measuring measurement points subsequent to the measurement start point P1, the motor 265 is controlled such that a measurement pressure is constantly applied to the rotation base 261 in a direction indicated by an arrow B in FIG. 22 (a counterclockwise direction around the point O).

In FIG. 24, if the rotation angle of the central point So when the next measurement point P2 is measured is θ2, the coordinate (x2,y2) of the central point So with respect to the reference point O is calculated on the basis of the distance Rs and the rotation angle θ2. The controller 50 determines the XY movement position of the sensor unit 250 for measuring the next measurement point P3 on the basis of the measured points P1 and P2. For example, the amount (Δx2,Δy2) of change in the XY directions of the point P2 with respect to the point P1 is calculated, and in moving the sensor unit 250 to measure the next measurement point, the sensor unit 250 is moved to a position at which the amount (Δx2,Δy2) of change is corrected. Hereinafter, this processing is repeated, and position information of the measurement points on the entire periphery is obtained. Preferably, similarly to the rim, it is predicted that the next measurement point P3 is in the extension line direction of a line connecting the measured points P1 and P2, and the reference point O of the sensor unit 250 is moved. The position of the actual measurement point P3 is calculated on the basis of the XY movement information of the sensor unit 250 when the reference point O is moved and the angle (θ3) at which the central point So is rotated to follow the change in the radius of the template TP. In measuring the next measurement point P4, the direction in which the measurement point P4 is positioned is predicted on the basis of the measured points P2 and P3 (or a curve shape may be predicted from three or more measured points), and the reference point O of the sensor unit 250 is moved such that the tracing stylus shaft 282 is moved to the predicted point. Thereafter, with the same method, the measurement point of an unmeasured portion is predicted and the sensor unit 250 is moved in the XY directions, thereby obtaining information of the measurement points on the entire periphery.

A radial shape TPs which is obtained at the central point So of the tracing stylus shaft 282 and connects the measurement points is slightly greater than the radial shape of the template TP by the radius rs of the tracing stylus shaft 282. The actual radial shape of the template TP is calculated to be a similarity shape inwardly smaller than the radial shape TPs by the distance of the radius rs.

With the above-described method, in the measurement unit 200 configured to move the sensor unit 250 in the XY directions, it becomes possible to measure the shape of the template TP using the tracing stylus shaft 282.

The method of measuring a template using the tracing stylus shaft 282 is not limited to that described above, and various methods may be used. For example, a contact portion of the template TP is provided on the front side (the right side of FIG. 8 and the tip end side of the tracing stylus 281) of the tracing stylus shaft 282 or the rear side (the left side of FIG. 8). In measuring the template TP, the controller 50 controls the XY position of the sensor unit 250 and the rotation of the rotation unit 260 by the same control method as in measuring the radius of the rim on the basis of the measured radial position of the template TP such that the contact portion comes into contact with the template TP while maintaining the vertical state (the plane parallel to the Z direction) in a state where the tracing stylus shaft 282 is tilted to the left side of FIG. 8 at a predetermined angle (for example, 5 degrees). The measurement pressure which presses the tracing stylus shaft 282 against the template TP is applied by the urging force of the spring 291. In the configuration in which the tracing stylus shaft 282 is not tilted, and the tracing stylus shaft 282 is moved in the horizontal direction in the vertical state (in parallel to the Z axis), the contact portion of the template TP is the lateral surface of the tracing stylus shaft 282 (the tip end side of the tracing stylus 281 or the rear side).

What is claimed is:
1. An eyeglass frame shape measuring apparatus for measuring a shape of a rim of an eyeglass frame, comprising:
  a tracing stylus including a tip end configured to be inserted into and move along a groove of the rim to detect a position of the rim in a moving radius direction of the tracing stylus and in a vertical direction perpendicular to the moving radius direction;
  a tracing stylus shaft including an upper part to which the tracing stylus is attached;
  a holding unit configured to hold the tracing stylus shaft to be movable in the vertical direction and a direction of the tip end of the tracing stylus, the holding unit including a pressure applying element configured to apply a pressure to the tracing stylus shaft so as to press the tip end of the tracing stylus to the groove of the rim in the direction of the tip end of the tracing stylus;
  a moving unit configured to two-dimensionally move the holding unit in the moving radius direction;
  a rotating unit configured to rotate the holding unit around an axis along the vertical direction to change the direction of the tip end of the tracing stylus;

a moving radius position detection unit configured to detect a position of the tracing stylus in the moving radius direction, the moving radius position detection unit including at least a first detection unit configured to detect a position of the holding unit in the moving radius direction and a second detection unit configured to detect a position of the tracing stylus in the moving radius direction relative to the holding unit; and a controller configured to obtain a rotating angle of the rotating unit and a position of the holding unit in the moving radius direction at a next measurement position based on a detecting result of the moving radius position detecting unit obtained after starting a measurement, and control the rotating unit and the moving unit based on the obtained rotating angle and the obtained position.

2. The apparatus according to claim 1, wherein the controller predicts the next measurement position based on the detecting result of the moving radius position detection unit and obtains the rotating angle of the rotating unit and the position of the holding unit in the moving radius direction at the predicted next measurement position.

3. The apparatus according to claim 1, wherein the rotating unit is provided at the holding unit, the controller controls the rotating unit so as to direct the direction of the tip end of the tracing stylus to any one of:

a first direction which is substantially a normal direction to a predicted shape in which a shape of an unmeasured portion of the rim is predicted based on the detecting result of the moving radius position detection unit;

a second direction which is in the moving radius direction at the measurement position with respect to a predetermined reference position set inside the rim; and a third direction between the first and second directions.

4. The apparatus according to claim 1, wherein the rotating unit is provided at the moving unit, and the controller directs the direction of the tip end of the tracing stylus to the moving radius direction at the measurement position with respect to a reference position which is a rotation center of the rotating unit.

5. The apparatus according to claim 1, wherein the holding unit includes a bearing configured to holding the tracing stylus shaft so that the tracing stylus shaft can be tilted in the direction of the tip end of the tracing stylus around a shaft set at a lower part of the tracing stylus shaft, the pressure applying element applies the pressure so that the tracing stylus shaft tilts to the direction of the tip end of the tracing stylus around the shaft, the second detection unit includes a rotation detection unit configured to detect a tilt angle of the tracing stylus shaft around the shaft.

6. The apparatus according to claim 1 further comprising a vertical position detection unit configured to detect a position of the tracing stylus in the vertical direction, wherein the controller determines a tilt angle of the tracing stylus shaft with respect to the vertical direction based on a detection result of the vertical position detection unit, and controls the moving unit so as to tilt the tracing stylus shaft to the determined tilt angle.

7. The apparatus according to claim 6, wherein the controller determines the tilt angle of the tracing stylus shaft so that the tilt angle increases as the measurement position with respect to a predetermined reference position in the vertical direction becomes high.

8. The apparatus according to claim 1, wherein the rotating unit is provided at the holding unit, the second detection unit includes a sensor for detecting the rotating angle of the rotating unit, and a sensor for detecting the position of the tracing stylus in the direction of the tip end of the tracing stylus.

9. The apparatus according to claim 1, wherein the moving unit includes a X-direction motor and a Y-direction motor for two-dimensionally moving the holding unit in a X direction and a Y direction of the moving radius direction, and the first detection unit detects the position of the holding unit in the moving radius direction based on driving data of the X-direction motor and the Y-direction motor.

10. The apparatus according to claim 1, the moving unit includes a rotating base to be rotatable around an axis along the vertical direction and is located inside the rim, a rotating motor configured to rotate the rotating base, and a horizontal moving unit having a motor for moving the holding unit in the moving radius direction with a rotation center of the rotating base as a reference position, and the first detection unit detects the position of the holding unit in the moving radius direction based on driving data of the motors of the moving unit.

* * * * *